United States Patent
Takagi et al.

(10) Patent No.: US 9,588,350 B2
(45) Date of Patent: Mar. 7, 2017

(54) IMAGE DISPLAY DEVICE

(71) Applicant: KABUSHIKI KAISHA TOSHIBA, Minato-ku, Tokyo (JP)

(72) Inventors: Ayako Takagi, Yokosuka (JP); Shinichi Uehara, Tokyo (JP); Masako Kashiwagi, Yokohama (JP); Masahiro Baba, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 35 days.

(21) Appl. No.: 14/261,186

(22) Filed: Apr. 24, 2014

(65) Prior Publication Data

US 2014/0233101 A1 Aug. 21, 2014

Related U.S. Application Data

(63) Continuation of application No. PCT/JP2011/074916, filed on Oct. 28, 2011.

(51) Int. Cl.
 *G02B 27/22* (2006.01)
 *G02F 1/29* (2006.01)
 *G02F 1/1343* (2006.01)

(52) U.S. Cl.
 CPC ........... *G02B 27/2214* (2013.01); *G02F 1/29* (2013.01); *G02F 1/134309* (2013.01); *G02F 1/134363* (2013.01); *G02F 2001/294* (2013.01)

(58) Field of Classification Search
 CPC G02B 27/2214; G02B 5/1842; G02B 5/1876; G02B 5/1847; G02B 27/0037;
 (Continued)

(56) References Cited

U.S. PATENT DOCUMENTS 8,279,270 B2 10/2012 Huang et al.
8,520,062 B2 8/2013 Kim et al.
(Continued)

FOREIGN PATENT DOCUMENTS

CN 102193202 9/2011
JP 2009-519487 5/2009
(Continued)

OTHER PUBLICATIONS

International Search Report from the Japanese Patent Office for International Application No. PCT/JP2011/074916, mailed Dec. 27, 2011.
(Continued)

*Primary Examiner* — Scott J Sugarman
*Assistant Examiner* — Ibrahima Diedhiou
(74) *Attorney, Agent, or Firm* — Finnegan, Henderson, Farabow, Garrett & Dunner, LLP

(57) ABSTRACT

According to an embodiment, an image display device includes an optical element, a voltage controller, and a display. Regarding the optical element, the refractive-index distribution changes according to the voltage applied thereto. The voltage controller controls, in a first mode, the voltage applied to the optical element in such a way that a first-type refractive-index distribution is achieved which acts as a first-type Fresnel lens; and controls, in a second mode that is different than the first mode, the voltage applied to the optical element in such a way that a second-type refractive-index distribution is achieved which acts as a second-type Fresnel lens having a greater number of steps than the first-type Fresnel lens. The display is disposed on the back side of the optical element and displays images.

12 Claims, 14 Drawing Sheets

(58) Field of Classification Search
CPC .. G02B 3/08; G02B 5/188; G02F 1/29; G02F 1/134309; G02F 1/134363; G02F 2001/294; G02F 1/1343; G02F 1/292; G02F 1/13439; H01L 27/105; H01L 27/11526; H01L 27/11529; H01L 27/11543; Y10S 257/909; H04N 13/0404; H04N 13/0452
USPC ... 359/463, 242, 618, 642; 349/15, 193, 139
See application file for complete search history.

(56) References Cited

U.S. PATENT DOCUMENTS

| | | |
|---|---|---|
| 8,675,148 B2 | 3/2014 | Takagi et al. |
| 2008/0316380 A1 | 12/2008 | Ijzerman et al. |
| 2010/0302349 A1 | 12/2010 | Huang et al. |
| 2011/0199548 A1 | 8/2011 | Takama |
| 2011/0228181 A1* | 9/2011 | Jeong et al. .................. 349/15 |
| 2012/0162592 A1 | 6/2012 | Takagi et al. |
| 2014/0176841 A1 | 6/2014 | Takagi et al. |

FOREIGN PATENT DOCUMENTS

| | | |
|---|---|---|
| JP | 2010-282090 | 12/2010 |
| JP | 2011-164527 | 8/2011 |
| JP | 2011-186431 | 9/2011 |
| JP | 2011-197640 | 10/2011 |
| TW | 201044019 | 12/2010 |

OTHER PUBLICATIONS

Taiwan IPO Search Report and Office Action for corresponding Taiwanese Patent Application No. 100147122, completed on Mar. 4, 2014.

Notice of Rejection issued by the Japanese Patent Office on Nov. 11, 2014, for Japanese Patent Application No. 2013-540590, and English-language translation thereof.

* cited by examiner

LENS PITCH DIRECTION (IN FIRST MODE)

(IN SECOND MODE)

(IN FIRST MODE)

(IN SECOND MODE)

IMAGE DISPLAY DEVICE

CROSS-REFERENCE TO RELATED APPLICATIONS

This application is a continuation of PCT international application Ser. No. PCT/JP2011/074916 filed on Oct. 28, 2011 which designates the United States; the entire contents of which are incorporated herein by reference.

FIELD

Embodiments described herein relate generally to an image display device.

BACKGROUND

Typically, display devices capable of displaying stereoscopic (three-dimensional) images have been proposed. Moreover, there has been a demand for enabling selective display of two-dimensional (2D) images and three-dimensional (3D) images using the same display device. In order to meet that demand, a 2D/3D switching technology has been proposed.

Furthermore, a 3D display has also been proposed in which a plurality of lenses having the 2D/3D switching functionality is placed one upon another and which enables selective switching of the 3D display of each lens. For example, a technology is known in which two liquid crystal lens arrays having different focal point distances are placed one upon another and which enables switching between the numbers of parallaxes and between visible area angles. In this technology, each of the two types of liquid crystal lenses can switch between 2D display and 3D display due to ON/OFF control of the voltage applied thereto. Of the two types of liquid crystal lenses, the voltage to be applied to one liquid crystal lens is turned to the ON state and the voltage to be applied to the other lens is turned to the OFF state. With that, it becomes possible to achieve two types of 3D displays having different focal point distances.

However, in the technology described above, since it is necessary to have two layers of liquid crystal lens arrays, it results in an increase in the manufacturing cost. Moreover, since there is an increase in the thickness of the lens portion, the luminance undergoes a decline. In that regard, it is an object of the present invention to provide an image display device that enables switching between the numbers of parallaxes and between visible area angles while curbing an increase in the thickness of the lens portion.

DETAILED DESCRIPTION

Figure 1:
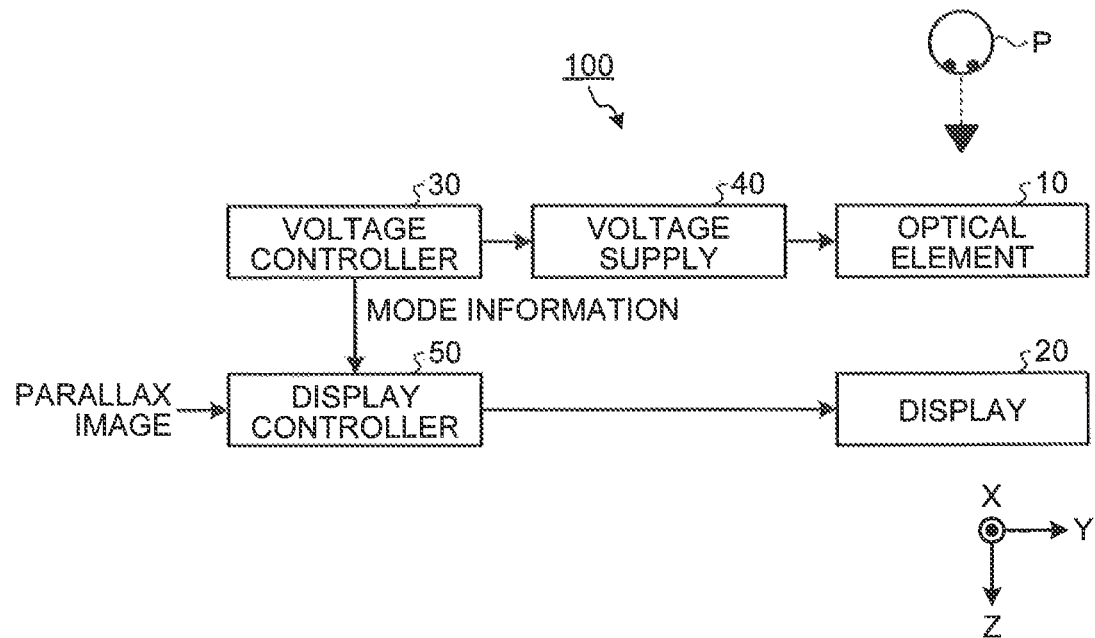
FIG. 1 is a diagram illustrating an image display device.

According to an embodiment, an image display device includes an optical element, a voltage controller, and a display. Regarding the optical element, the refractive-index distribution changes according to the voltage applied thereto. The voltage controller controls, in a first mode, the voltage applied to the optical element in such a way that a first-type refractive-index distribution is achieved which acts as a first-type Fresnel lens; and controls, in a second mode that is different than the first mode, the voltage applied to the optical element in such a way that a second-type refractive-index distribution is achieved which acts as a second-type Fresnel lens having a greater number of steps than the first-type Fresnel lens. The display is disposed on the back side of the optical element and displays images.

An embodiment is described below in detail with reference to the accompanying drawings. In the following embodiment, since the constituent elements referred to by the same reference numerals have the same functions, repetition is avoided in the description of the constituent elements.

FIG. 1 is a block diagram illustrating an image display device 100 according to the present embodiment. The image display device 100 is capable of displaying stereoscopic images (three-dimensional images). Moreover, the image display device 100 is also capable of displaying planar images (two-dimensional images), and is configured to be able to switch between displaying three-dimensional images and displaying two-dimensional images.

As illustrated in FIG. 1, the image display device 100 includes an optical element 10, a display 20, a voltage controller 30, a voltage supply 40, and a display controller 50. When a viewer P views the display 20 via the optical element 10, he or she becomes able to recognize a stereoscopic image being displayed on the display 20.

Regarding the optical element 10, the refractive-index distribution changes according to the voltage applied thereto. The light beams coming out from the display 20 and entering into the optical element 10 exit in a direction depending on the refractive-index distribution of the optical element 10. In the present embodiment, the explanation is given about an example in which the optical element 10 is a liquid crystal GRIN (gradient index) lens array. However, that is not the only possible case. Regarding a detailed configuration of the optical element 10 according to the present embodiment, the explanation is given later.

The display 20 is a device that is disposed on the back side of the optical element 10 and that displays images. For example, the display 20 displays parallax images that are used in displaying a stereoscopic image. For example, the display 20 can have a known configuration in which sub-pixels of RGB colors are arranged in a matrix-like manner with RGB constituting a single pixel. In the example illustrated in FIG. 1, a single pixel is made of RGB sub-pixels arranged in the Y-direction; and an image that is displayed on a group of pixels, which are adjacent pixels equal in number to the number of parallaxes and which are arranged in the X-direction orthogonal to the Y-direction, is called an element image. In the present embodiment, for each element image, a single liquid crystal GRIN lens is formed in a corresponding manner. The light from an element image exits in a direction depending on refractive-index distribution of the liquid crystal GRIN lens which corresponds to the element image. Meanwhile, any other known arrangement of sub-pixels can also be adopted in the display 20. Moreover, the sub-pixels are not limited to the three colors of RGB. Alternatively, for example, the sub-pixels can also have four colors.

For the display 20, it is possible to use a direct-view-type two-dimensional display such as an organic EL (Organic Electro Luminescence), an LCD (Liquid Crystal Display), a PDP (Plasma Display Panel), or a projection-type display.

The voltage controller 30 controls the voltage to be applied to the optical element 10. In the present embodiment, the voltage controller 30 receives a specified input of a mode indicating the type of display of three-dimensional images (the type of refractive-index distribution of the optical element 10), and sets the mode according to the received input. Then, depending on the mode that is set; the voltage controller 30 controls, in a variable manner, the voltage applied to the optical element 10. Moreover, the voltage controller 30 sends mode information, which indicates the set mode, to the display controller 50. Herein, examples of the mode include a first mode and a second mode. The second mode has a greater visible area angle and a greater number of parallaxes than the first mode. Herein, the visible area angle indicates the angle at which a viewer is able to view the images displayed on the display 20. Meanwhile, the method for setting the modes can be implemented in an arbitrary manner. For example, the configuration can be such that the switching between modes occurs automatically according to the number of viewers of three-dimensional images.

The voltage supply 40 supplies voltage to the optical element 10 under the control of the voltage controller 30. The display controller 50 controls the display 20 to display images (such as parallax images). In the present embodiment, according to mode information received from the voltage controller 30, the display controller 50 obtains the parallax images to be displayed and then controls the display 20 to display the parallax images that are obtained.

Figure 2:
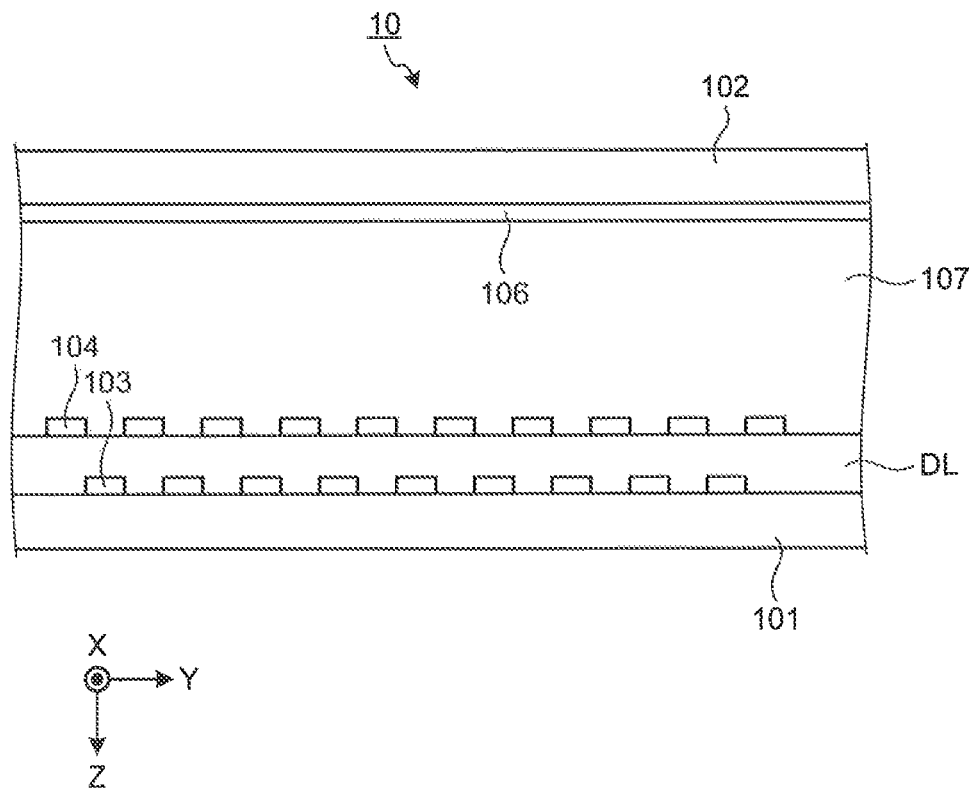
FIG. 2 is a cross-sectional diagram illustrating an optical element.

FIG. 2 is a cross-sectional diagram illustrating the optical element 10. As illustrated in FIG. 2, the optical element 10 includes a first substrate 101 that is transparent; a second substrate 102 that is positioned opposite to the first substrate and that is transparent; and a liquid crystal layer 107 that is placed between the first substrate 101 and the second substrate 102. On the surface of the first substrate 101 on the side of the liquid crystal layer 107, a plurality of first-type electrodes 103 that is transparent is formed. Each first-type electrode 103 is formed to extend in the X-direction illustrated in FIG. 2 from the surface of the first substrate 101 on the side of the liquid crystal layer 107.

Each first-type electrode 103 has a covering of a dielectrical layer DL. On the upper surface of the dielectrical layer DL, a plurality of the second-type electrodes 104 is formed. Each second-type electrode 104 is formed to extend in the X-direction illustrated in FIG. 2 from the upper surface of the dielectrical layer DL. In the example illustrated in FIG. 2, the first-type electrodes 103 and the second-type electrodes 104 have the same width (dimension in the Y-direction illustrated in FIG. 2) and are arranged in a cyclic manner at the same pitch. When viewed from the Z-direction illustrated in FIG. 2, the adjacent second-type electrodes 104 have the single first-type electrode 103 positioned therebetween. Herein, although the first-type electrodes 103 may or may not overlap with the second-type electrodes 104, it is desirable to have the inter-electrode pitch to be shorter than the width of the electrodes.

On the second substrate 102, an opposite electrode 106 that is transparent is formed across the entire surface on the side of the liquid crystal layer 107. Thus, the opposite electrode 106 is placed opposite to each of the plurality of the first-type electrodes 103 and opposite to each of the plurality of the second-type electrodes 104. Each first-type electrode 103, each second-type electrode 104, and the opposite electrode 106 are supplied with an electrical potential from the voltage supply 40. The value of the electrical potential supplied to each electrode is controlled by the voltage controller 30. Meanwhile, the liquid crystal layer 107 includes liquid crystal molecules and a dispersion medium for the purpose of dispersing the liquid crystal molecules. In the present embodiment, as an example of the liquid crystal molecules, a material exhibiting uniaxial birefringence is used.

Figure 3:
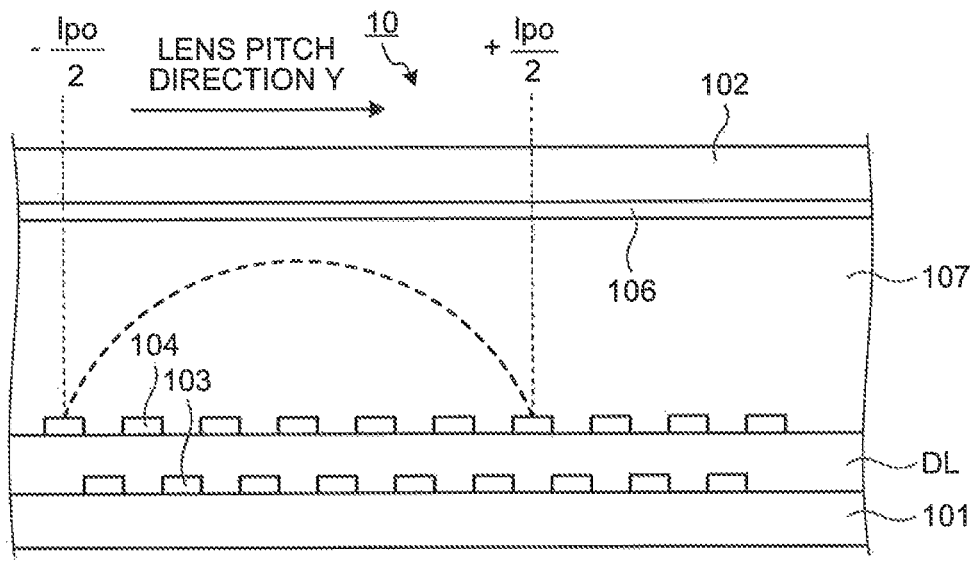
FIG. 3 is a diagram for explaining a favorable refractive-index distribution of a liquid crystal GRIN lens.

The following explanation is given about a favorable refractive-index distribution for the purpose of achieving light condensing at a liquid crystal GRIN lens. With reference to FIG. 3, a case is assumed in which Y represents the lens pitch direction; Ne represents the refractive index in the long axis direction of the liquid crystal molecules; No (<Ne) represents the refractive index in the short axis direction of the liquid crystal molecules; (Ne−No) represents the birefringence of the refractive index of the liquid crystals; and a liquid crystal GRIN lens is formed in the section starting from a coordinate −lpo/2 to a coordinate +lpo/2 (i.e., a liquid crystal GRIN lens having the lens pitch lpo is formed). In this case, a favorable refractive-index distribution for the purpose of achieving light condensing at the liquid crystal GRIN lens can be expressed using Equation (1) given below.

$$n(Y) = Ne - 4\left[\frac{Ne - No}{lpo^2}\right]Y^2 \qquad (1)$$

Moreover, a retardation distribution can be expressed using Equation (2) obtained by multiplying both sides of Equation (1) given above by a thickness t of the liquid crystals and by subtracting Not therefrom. Herein, the tilt distribution of liquid crystals is not constant in the thickness direction. Hence, while comparing the performances of liquid crystal GRIN lenses, the actual condition can be better expressed using the retardation distribution instead of the refractive-index distribution.

$$n(Y)t - Not = Net - 4\left[\frac{Ne - No}{lpo^2}\right]tY^2 - Not \quad (2)$$

$$Re = (Ne - Not)t - 4\left[\frac{Ne - No}{lpo^2}\right]tY^2$$

Figure 4:
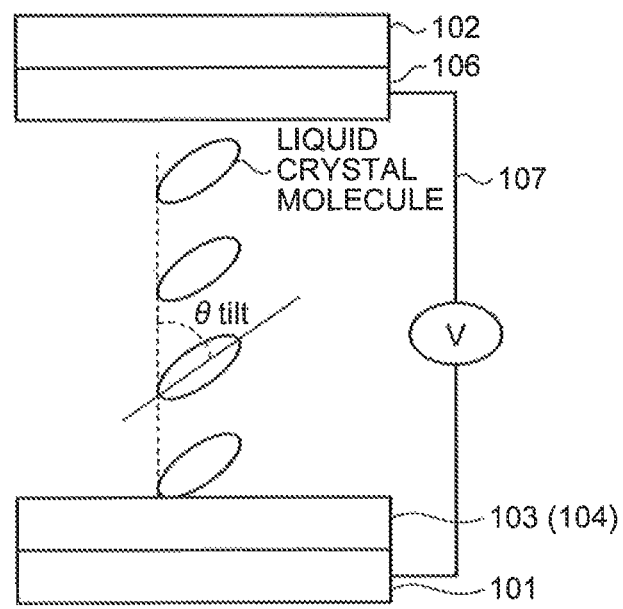
FIG. 4 is a diagram for explaining an angle at which liquid crystal molecules rise.

As illustrated in FIG. 4, θtilt represents the angle at which the liquid crystal molecules rise. In this example, θtilt is expressed as the angle in the long axis direction of liquid crystal molecules with respect to the normal line of the first substrate 101. If the liquid crystals are uniaxial; then, depending on the angles θtilt at which the liquid crystal molecules rise, the refractive index with respect to polarization having the same direction as the orientation of the liquid crystal molecules varies. The relationship between the tilt (θtilt) of liquid crystal directors (the average direction in the long axis of liquid crystal molecules) and the refractive index can be expressed using Equation (3) given below.

$$N(\theta\text{tilt}) = \frac{NeNo}{\sqrt{Ne^2\sin^2\theta\text{tilt} + No^2\cos^2\theta\text{tilt}}} \quad (3)$$

Figure 5:
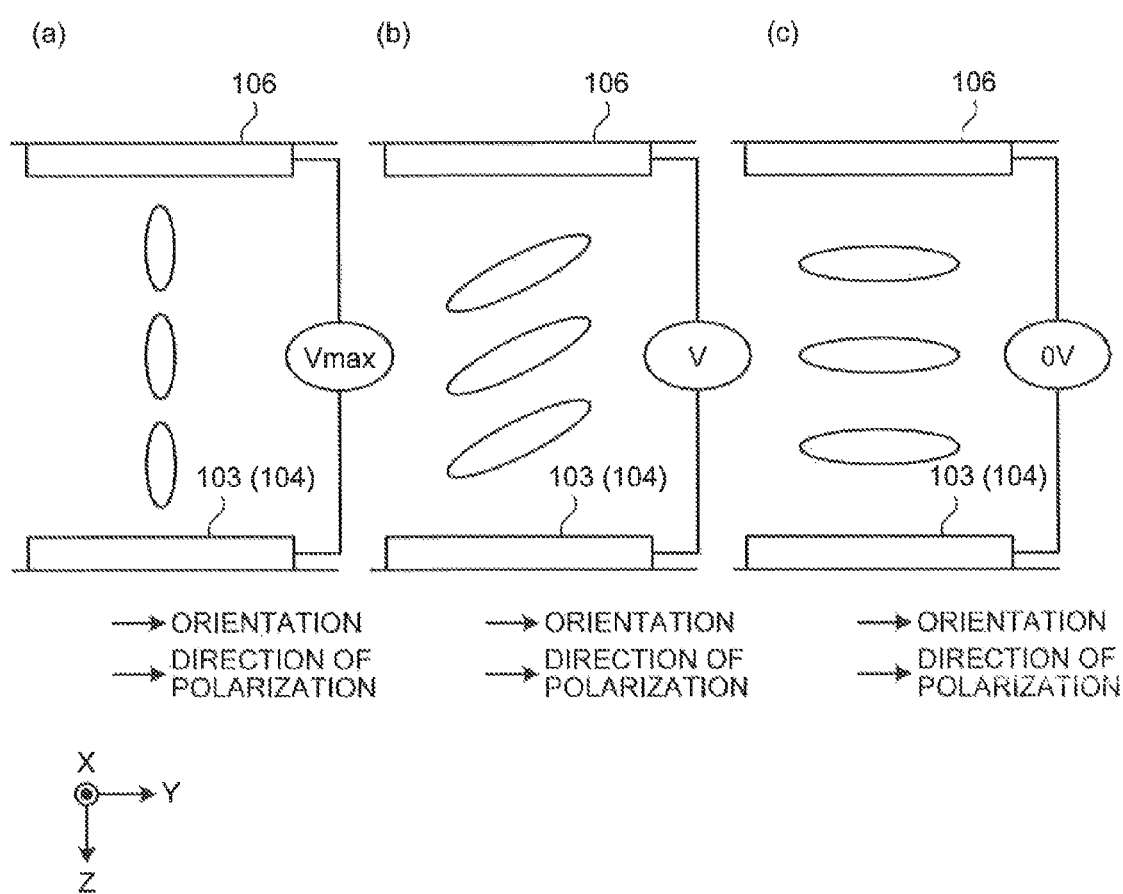
FIG. 5 is a diagram for explaining a method for controlling the tilt of liquid crystal directors.

Herein, as illustrated in FIG. 5, it is assumed that the direction of polarization (in the example illustrated in FIG. 5, the Y-direction) is the same as the orientation of the liquid crystal directors. When a voltage is generated between the upper electrode (the opposite electrode 106) and a lower electrode (the first-type electrode 103 or the second-type electrode 104), the tilt of the liquid crystal directors changes according to that voltage. The more specific explanation is as follows.

In the example illustrated in FIG. 5, as illustrated in part (a), if a voltage value Vmax that enables sufficient rising of the liquid crystal molecules is applied between the upper electrode and a lower electrode, then θtilt=0° is satisfied. As a result, as can be understood from Equation (3) too, in this case, the refractive index N(0)=No (the refractive index in the short axis direction) is satisfied. Moreover, as illustrated in part (c) in FIG. 5, if a voltage (≥0 V) that is below a threshold voltage Vth, which is required for the rising of the liquid crystal molecules, is applied between the upper electrode and a lower electrode, then θtilt=90° is satisfied. As a result, as can be understood from Equation (3) too, in this case, the refractive index N(90)=Ne (the refractive index in the long axis direction) is satisfied. Furthermore, as illustrated in part (b) in FIG. 5, if a voltage in the range from Vth to Vmax is applied between the upper electrode and a lower electrodes, then θtilt is equal to an angle θ in the range from 0° to 90°, and a refractive index N(θ) is equal to a value in the range from No to Ne.

On the basis of the explanation given above, if the voltage applied to each electrode is controlled in such a way that the electrodes placed at the positions corresponding to the ends of a liquid crystal GRIN lens are applied with the maximum voltage and in such a way that, closer an electrode to the electrode placed at the position corresponding to the lens center, smaller is the voltage applied thereto; then it becomes possible to achieve a refractive-index distribution that is close to the refractive-index distribution represented in Equation (1).

Given below is the explanation of a method for forming two types of liquid crystal GRIN lenses having different lens pitches but having the same focal point distance. In a Fresnel lens, a single lens is partitioned in several partitions along the lens pitch direction; and the flat portion in the thickness direction of each partition is removed while retaining the curved surface with the aim of achieving a thinner Fresnel lens. Herein, consider a case in which Fresnel-type liquid crystal GRIN lenses are formed with the lens pitch set to be variable. That is, in a plurality of lenses partitioned in the horizontal direction, the curved surfaces are formed such that the focal point distances of those lenses are substantially the same. With that, while maintaining the focal point distance of the center lens of the Fresnel lens, if the number of Fresnel steps is increased; it becomes possible to increase the lens pitch.

Figure 6:
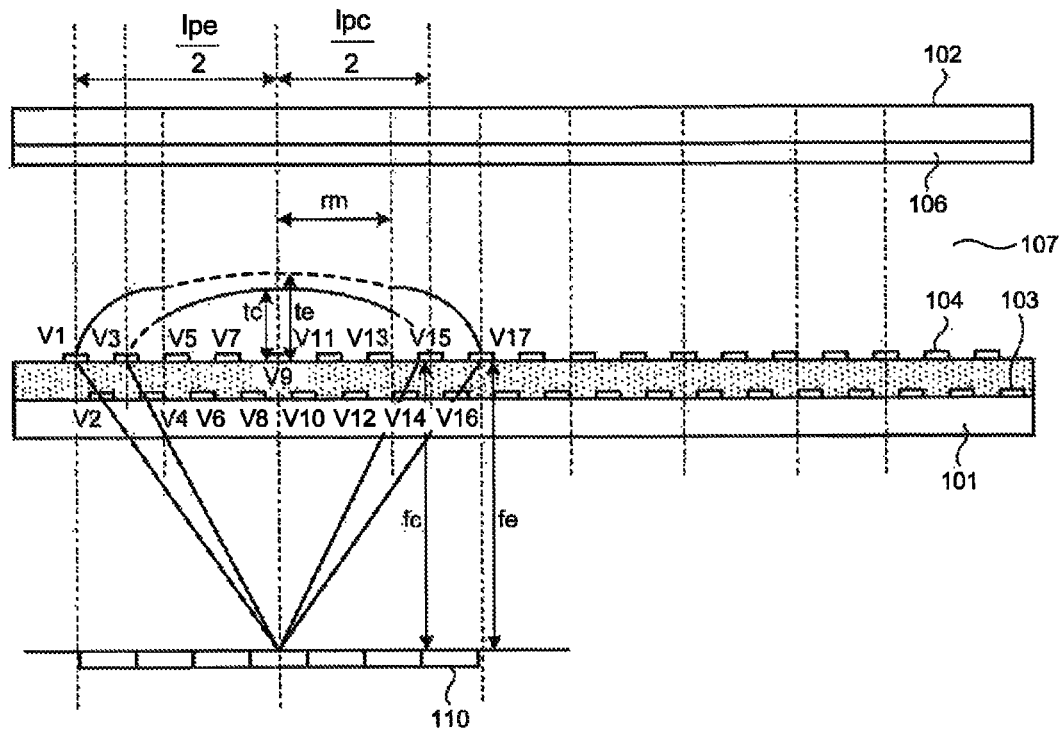
FIG. 6 illustrates a Fresnel lens.

In FIG. 6 illustrates an example of a retardation distribution that is favorable for forming a Fresnel-type liquid crystal GRIN lens having one step. Herein, the portion toward the center with reference to the step is called a center lens. In the example illustrated in FIG. 6, it is assumed that lpe represents the lens pitch of the Fresnel lens. Then, of the concentric circles that partition a convex lens (a single lens) having the lens pitch lpe, the concentric circle having a minimum radius rm partitions a particular lens surface; and that lens surface can be regarded as the center lens. In the example illustrated in FIG. 6, the center lens is assumed to have a lens pitch lpc (<lpe). Moreover, the portion toward the ends of the lens with reference to the step is called an edge lens. In the example illustrated in FIG. 6, annular lens surfaces enclosed between a first concentric circle (the concentric circle having the minimum radius rm), which clips the center lens, and a second concentric circle, which has the radius equal to half of the lens pitch of the Fresnel lens (i.e., radius equal to lpe/2 illustrated in FIG. 6), can be regarded as the edge lens. Thus, from among a plurality of lens surfaces constituting the Fresnel lens, annular lens surfaces other than the center lens can also be regarded as the edge lens.

In order to achieve a satisfactory glasses-free 3D display; as illustrated in FIG. 6, it is desirable that a focal point distance fc of the center lens as well as a focal point distance fe of the edge lens is made to match the distance between the lens and pixels 110. Because of that, the lens pitch of the lens corresponding to the single pixel 110 can be varied without having to change the focal point distance. That is, the number of parallaxes and the visible area angle can be varied without having to change the focal point distance.

If lpc represents the lens pitch of the center lens, and if tc represents the liquid crystal thickness of the center lens; then the focal point distance fc of the liquid crystal GRIN lens serving as the center lens can be expressed using Equation (4).

$$fc = lpc^2/8\Delta ntc \quad (4)$$

Moreover, if lpe represents the lens pitch of the edge lens and if te represents the liquid crystal thickness of the edge lens, then the focus point distance fe of the liquid crystal GRIN lens serving as the edge lens can be expressed using Equation (5).

$$fe = lpe^2/8\Delta nte \quad (5)$$

Stated below are the necessary conditions for switching the lens pitch between lpc and lpe in one layer, where lpe is equal to m number of times (m>1) of lpc. Firstly, the relationship between lpc and lpe can be expressed using Equation (6).

$$lpe = m \times lpc \quad (6)$$

As described above, regarding a liquid crystal GRIN lens having the lens pitch lpc and having the liquid crystal thickness tc, the focal point distance fc can be expressed using Equation (7). Regarding a liquid crystal GRIN lens having the lens pitch lpe and having the liquid crystal thickness te, the focal point distance fe can be expressed using Equation (8).

$$fc = lpc^2 / 8\Delta ntc \quad (7)$$

$$fe = lpe^2 / 8\Delta nte = m^2 lpc^2 / 8\Delta nte \quad (8)$$

For the focal point distance fc and the focal point distance fe to be identical, it is necessary that Equation (9) given below is satisfied.

$$te = m^2 \times tc \quad (9)$$

In this case, Equation (8) becomes $$fe = m^2 lpc^2 / 8\Delta n(m^2 tc) = lpc^2 / 8\Delta ntc.$$

Hence, fc=fe is satisfied.

For example, in order to double the lens pitch, m=2 is satisfied in Equation (6). In this case, Equation (9) can be expressed as Equation (10) given below. That is, it is necessary to quadruply the liquid crystal thickness.

$$te = 4 \times tc \quad (10)$$

For example, consider a case in which, in the first mode, a liquid crystal GRIN lens is formed which acts as a convex lens having the lens pitch equal to lpc; and, in the second mode, a liquid crystal GRIN lens is formed which acts as a convex lens having the lens pitch equal to two times of lpc. In that case, the liquid crystal thickness required for the formation of the liquid crystal GRIN lens in the second mode is quadruple of the liquid crystal thickness required for the formation of the liquid crystal GRIN lens in the first mode. For that reason, it is not possible to reduce the thickness of the lens portion, thereby leading to a decline in the luminance.

In contrast, in the present embodiment, in the first mode, the voltage controller 30 controls the voltage applied to the optical element 10 in such a way that a refractive-index distribution is achieved which acts as a Fresnel lens having zero steps (acts as a first-type Fresnel lens). In the second mode, the voltage controller 30 controls the voltage applied to the optical element 10 in such a way that a refractive-index distribution is achieved which acts as a Fresnel lens having a greater number of steps than the first-type Fresnel lens (acts as a second-type Fresnel lens). Herein, in the first mode, the voltage controller 30 controls the voltage applied to the optical element 10 in such a way that a lens array (a first-type lens array) is formed in which first-type Fresnel lenses are arranged in a cyclic manner. In the second mode, the voltage controller 30 controls the voltage applied to the optical element 10 in such a way that a lens array (a second-type lens array) is formed in which second-type Fresnel lenses are arranged in a cyclic manner. Meanwhile, a Fresnel lens having zero steps can be regarded as a single convex lens (a single lens). For example, if, in the second mode, the voltage applied to the optical element 10 is controlled in such a way that a Fresnel-type liquid crystal GRIN lens is formed with the lens pitch twice as much as the lens pitch of the liquid crystal GRIN lens formed in the first mode; then it becomes possible to curb an increase in the thickness of the lens portion while being able to expand the lens pitch.

As an example of the voltage conditions for the formation of a Fresnel-type liquid crystal GRIN lens, given below is the explanation of the voltage conditions for the formation of the Fresnel-type liquid crystal GRIN lens illustrated by solid lines in FIG. 6. In the example illustrated in FIG. 6, from among a plurality of the second-type electrodes 104, the first second-type electrode 104 from the left side is placed corresponding to one end of the Fresnel-type liquid crystal GRIN lens, and the ninth second-type electrode 104 from the left side is placed corresponding to the other end of the Fresnel-type liquid crystal GRIN lens. Moreover, from among a plurality of the second-type electrodes 104, the fifth second-type electrode 104 from the left side is placed corresponding to the center of the Fresnel-type liquid crystal GRIN lens. In the example illustrated in FIG. 6, V1 represents the electrical potential supplied to the first second-type electrode 104 from the left side; V3 represents the electrical potential supplied to the second second-type electrode 104 from the left side; V5 represents the electrical potential supplied to the third second-type electrode 104 from the left side; V7 represents the electrical potential supplied to the fourth second-type electrode 104 from the left side; V9 represents the electrical potential supplied to the fifth second-type electrode 104 from the left side; V11 represents the electrical potential supplied to the sixth second-type electrode 104 from the left side; V13 represents the electrical potential supplied to the seventh second-type electrode 104 from the left side; V15 represents the electrical potential supplied to the eighth second-type electrode 104 from the left side; and V17 represents the electrical potential supplied to the ninth second-type electrode 104 from the left side. Moreover, in this example, the electrical potential supplied to the opposite electrode 106 is set to 0 V.

Furthermore, from among a plurality of the first-type electrodes 103, the first to eighth first-type electrodes 103 from the left side are used in the formation of the Fresnel-type liquid crystal GRIN lens illustrated in FIG. 6. In the example illustrated in FIG. 6, V2 represents the electrical potential supplied to the first first-type electrode 103 from the left side; V4 represents the electrical potential supplied to the second first-type electrode 103 from the left side; V6 represents the electrical potential supplied to the third first-type electrode 103 from the left side; V8 represents the electrical potential supplied to the fourth first-type electrode 103 from the left side; V10 represents the electrical potential supplied to the fifth first-type electrode 103 from the left side; V12 represents the electrical potential supplied to the sixth first-type electrode 103 from the left side; V14 represents the electrical potential supplied to the seventh first-type electrode 103 from the left side; and V16 represents the electrical potential supplied to the eighth first-type electrode 103 from the left side.

In the example illustrated in FIG. 6, the second-type electrode 104 supplied with the electrical potential V5 as well as the second-type electrode 104 supplied with the electrical potential V13 is placed corresponding to the step of the Fresnel-type liquid crystal GRIN lens (i.e., corresponding to the Fresnel step). In other words, the second-type electrode 104 supplied with the electrical potential V5 and the second-type electrode 104 supplied with the electrical potential V13 can be regarded as the electrodes used in forming the Fresnel step.

Figure 7:
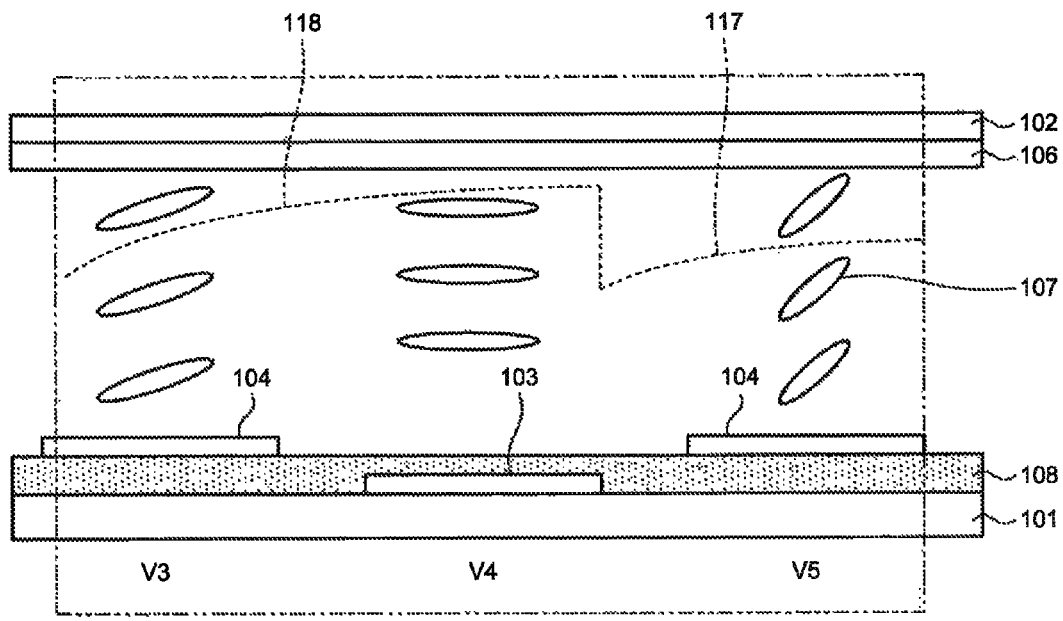
FIG. 7 illustrates a step of the Fresnel lens.

FIG. 7 is a diagram that schematically illustrates the tilt of the liquid crystals present immediately above the second-type electrode 104 supplied with the electrical potential V3, the tilt of the liquid crystals present immediately above the second-type electrode 104 supplied with the electrical potential V4, and the tilt of the liquid crystals present immediately above the second-type electrode 104 supplied with the electrical potential V5. In FIG. 7, a dotted line portion 117 indicates the retardation distribution of the center lens. Moreover, in FIG. 7, a dotted line portion 118 indicates the retardation distribution of the edge lens. Herein, if N3 represents the average refractive-index distribution of the liquid crystals present immediately above the second-type electrode 104 supplied with the electrical potential V3, if N4 represents the average refractive-index distribution of the liquid crystals present immediately above the second-type electrode 104 supplied with the electrical potential V4, and if N5 represents the average refractive-index distribution of the liquid crystals present immediately above the second-type electrode 104 supplied with the electrical potential V5; then the refractive-index distribution of liquid crystals exhibits a large value immediately above the second-type electrode 104 supplied with the electrical potential V4 but exhibits, due to the step of Fresnel lens, a small value immediately above the second-type electrode 104 supplied with the electrical potential V5. That is, N4>N3>N5 is satisfied. For that reason, the setting needs to be such that V4<V3<V5 is satisfied.

Thus, in the example illustrated in FIG. 6, the voltage condition for the formation of lenses on the left side of the lens center becomes V1>V2>V3>V4<V5>V6>V7>V8>V9. Regarding the voltage condition for the formation of lenses on the right side of the lens center, it is possible to think in the same manner. Thus, that voltage condition becomes V17(=V1)>V16>V15>V14<V13>V12>V11>V10<V9. In this way, the voltage applied to each electrode is controlled in such a way that the voltages V1 and V17 that are applied to the electrodes placed at the positions corresponding to the ends of the lens exhibit the maximum value, and in such a way that the voltages V5 and V13 that are applied to the electrodes placed at the position corresponding to the Fresnel step exhibit the local maximum value. As a result, it becomes possible to obtain the refractive-index distribution which acts as a Fresnel lens having one step (i.e., the Fresnel-type liquid crystal GRIN lens illustrated in FIG. 6 is formed). Herein, the distance between those electrodes regarding which the applied voltages exhibit the maximum value (in this example, the distance lpe between the second-type electrode 104 supplied with the electrical potential V1 and the second-type electrode 104 supplied with the electrical potential V17) can be regarded as the lens pitch of the Fresnel-type liquid crystal GRIN lens illustrated in FIG. 6.

Figure 8:
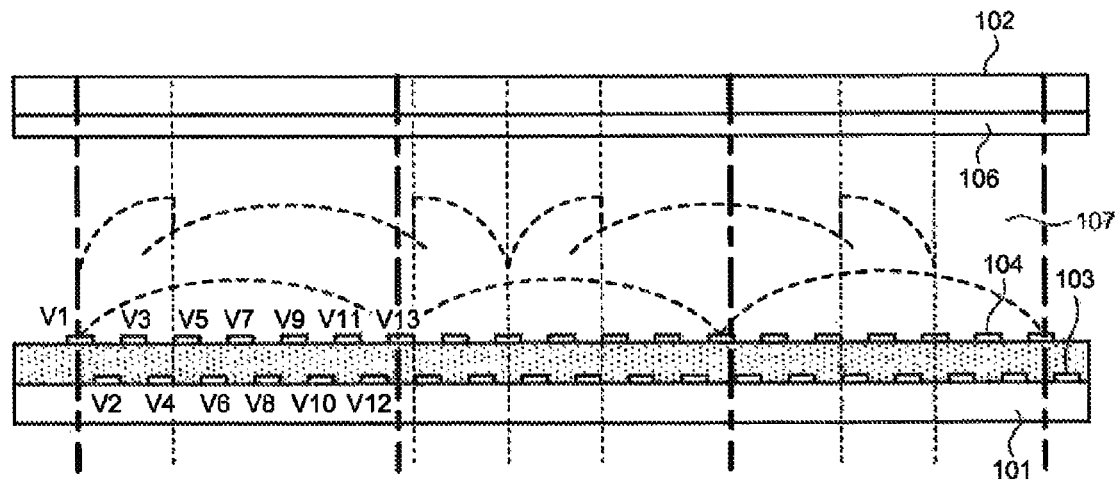
FIG. 8 illustrates a single lens.

Explained below with reference to FIG. 8 are the voltage conditions for the formation of a single-lens-type liquid crystal GRIN lens (i.e., a Fresnel-type liquid crystal lens having zero steps) that has substantially the same focal point distance as the focal point distance of the Fresnel-type liquid crystal GRIN lens illustrated in FIG. 6. In the example illustrated in FIG. 8, from among a plurality of the second-type electrodes 104, the first second-type electrode 104 from the left side is placed corresponding to one end of the single-lens-type liquid crystal GRIN lens, and the seventh second-type electrode 104 from the left side is placed corresponding to the other end of the single-lens-type liquid crystal GRIN lens. Moreover, from among a plurality of the second-type electrodes 104, the fourth second-type electrode 104 from the left side is placed corresponding to the center of the single-lens-type liquid crystal GRIN lens. In the example illustrated in FIG. 8, V1 represents the electrical potential supplied to the first second-type electrode 104 from the left side; V3 represents the electrical potential supplied to the second second-type electrode 104 from the left side; V5 represents the electrical potential supplied to the third second-type electrode 104 from the left side; V7 represents the electrical potential supplied to the fourth second-type electrode 104 from the left side; V9 represents the electrical potential supplied to the fifth second-type electrode 104 from the left side; V11 represents the electrical potential supplied to the sixth second-type electrode 104 from the left side; and V13 represents the electrical potential supplied to the seventh second-type electrode 104 from the left side. Moreover, the electrical potential supplied to the opposite electrode 106 is set to 0 V.

Furthermore, in this example, from among a plurality of the first-type electrodes 103, the first to sixth first-type electrodes 103 from the left side are used in the formation of the single-lens-type liquid crystal GRIN lens illustrated in FIG. 8. Herein, V2 represents the electrical potential supplied to the first first-type electrode 103 from the left side; V4 represents the electrical potential supplied to the second first-type electrode 103 from the left side; V6 represents the electrical potential supplied to the third first-type electrode 103 from the left side; V8 represents the electrical potential supplied to the fourth first-type electrode 103 from the left side; V10 represents the electrical potential supplied to the fifth first-type electrode 103 from the left side; and V12 represents the electrical potential supplied to the sixth first-type electrode 103 from the left side.

If Ni represents the average refractive-index distribution of the liquid crystals present immediately above the electrodes supplied with voltages Vi (i=1 to 13); then it is desirable that the average refractive-index distribution Ni goes on decreasing from the lens center toward the ends of the lens so that the parabolic shape expressed in Equation (1) is achieved. Accordingly, it is desirable that the lenses present on the left side of the lens center have the average refractive-index distribution satisfying N7>N6>N5>N4>N3>N2>N1; while it is desirable that the lenses present on the right side of the lens center have the average refractive-index distribution satisfying N7>N8>N9>N10>N11>N12>N13. Thus, the voltage condition for the formation of the lenses present on the left side becomes V1>V2>V3>V4>V5>V6>V7. Moreover, the voltage condition for the formation of the lenses present on the right side becomes V13(=V1)>V12>V11>V10>V9>V8>V7.

In this way, the voltage applied to each electrode is controlled in such a way that the voltages V1 and V13 that are applied to the electrodes placed at the positions corresponding to the ends of the lens exhibit the maximum value; in such a way that, closer an electrode to the electrode placed at the position corresponding to the lens center, smaller is the voltage applied to that electrode; and in such a way that the voltage V7 that is applied to the electrode placed at the position corresponding to the lens center exhibits the minimum value. As a result, it becomes possible to obtain a refractive-index distribution which acts as a single lens (i.e., the single-lens-type liquid crystal GRIN lens is formed). Herein, the distance between those electrodes regarding which the applied voltages exhibit the maximum value (in this example, the distance between the second-type electrode 104 supplied with the electrical potential V1 and the second-type electrode 104 supplied with the electrical potential V13) can be regarded as the lens pitch of the single-lens-type liquid crystal GRIN lens.

Figure 9:
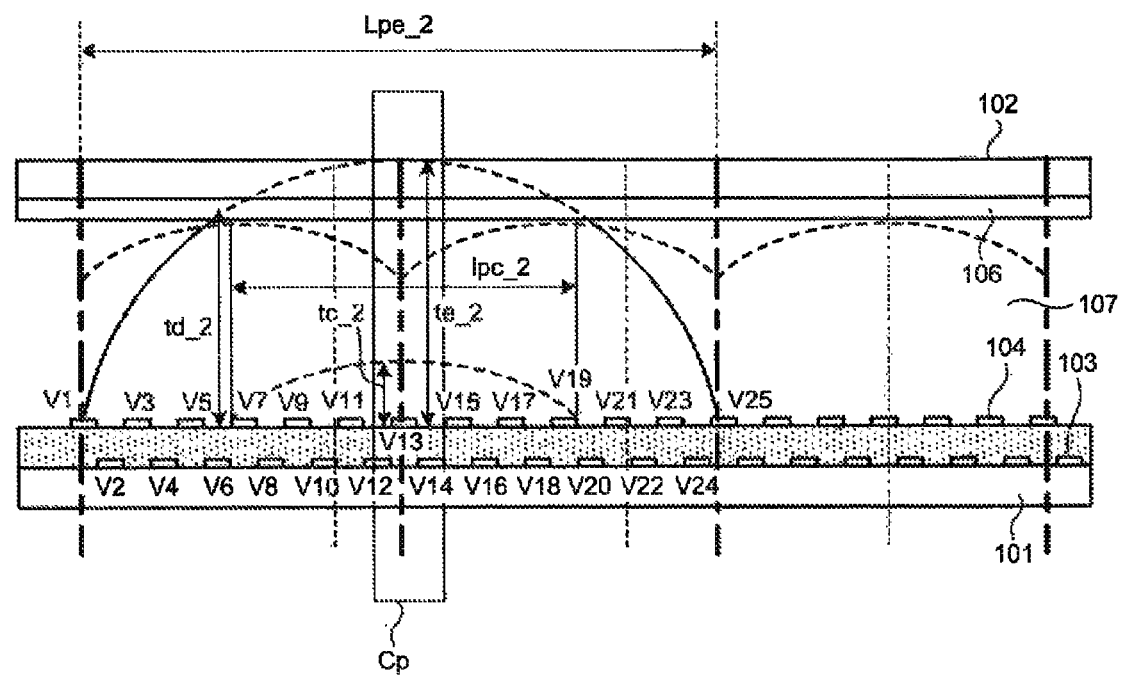
FIG. 9 illustrates a Fresnel lens.

Herein, while switching between the lens pitches instead of varying the lens pitch infinitesimally, varying the lens pitch in a large way such as by two or three times is effective. Explained below with reference to FIG. 9 is an example in which the lens pitch is doubled. Herein, if the focal point distance is not changed, then the number of parallaxes becomes double and it becomes possible to double the visible area angle. Meanwhile, although it is desirable that there is a steep refractive-index variation in the Fresnel step portion, there are times when it is difficult to steeply vary the refractive index because of the molecular structure of the liquid crystals. In such a case, by lowering the number of Fresnel steps (for example, lowering to one step), it becomes possible to reduce the number of light beams travelling in unintended directions due to the bluntness of the step portion.

In the example illustrated in FIG. 9, in the first mode, the voltage controller 30 controls the voltage supplied to each electrode in such a way that a refractive-index distribution is achieved which acts as a single lens having the lens pitch lpc_2 (acts as a Fresnel lens having zero steps). In the second mode, the voltage controller 30 controls the voltage supplied to each electrode in such a way that a refractive-index distribution is achieved which acts as a one-step Fresnel lens having the lens pitch lpe_2(=lpc_2×2). In this example, the single lens formed in the first mode matches with the center lens of the one-step Fresnel lens formed in the second mode. Thus, the voltage controller 30 controls the voltage applied to each electrode in such a way that the refractive-index distribution of the single lens formed in the first mode is identical to the refractive-index distribution of the center lens of the one-step Fresnel lens formed in the second mode.

Figure 10:
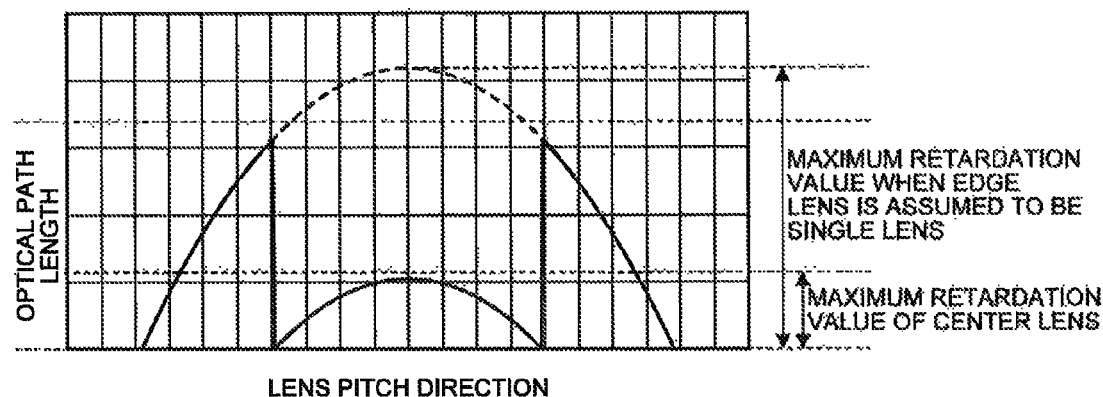
FIG. 10 is a diagram illustrating retardation values of a center lens and an edge lens.

According to Equation (10) given above, in order to double the lens pitch on condition that the focal point distance is not changed, it is necessary to quadruple the liquid crystal thickness or to quadruple the retardation (Δn×liquid crystal thickness) under the condition that Δn is constant. More particularly, as illustrated in FIG. 10, the maximum retardation value of the center lens (in this example, the retardation value at the lens center) is one-fourth of the maximum retardation value in the case in which the edge lens is assumed to be a single lens. If Ne_2 represents the average refractive index and if te_2 represents the liquid crystal thickness, then the maximum retardation value in the case in which the edge lens is assumed to be a single lens is expressed using Equation (11) given below.

$$Re\_edge=(Ne\_2-No)\times te\_2 \quad (11)$$

In the step portion at the ends of the center lens, the retardation value takes a value close to zero. It is desirable that this retardation value is as small as possible. The maximum retardation value of the center lens is expressed using Equation (12) given below.

$$Re\_center=(Ne\_2-No)\times te\_2/4 \quad (12)$$

Herein, a physical thickness tc_2 of the liquid crystals in the center lens is same as a thickness td_2 of the step portion (td_2=tc_2). Although the thickness td_2 of the step portion changes according to the lens pitch lpc_2 of the center lens, it is necessary that at least td_2<te_2 is satisfied. For that reason, when the maximum retardation value of the center lens is set to (Ne_2−No)×te_2/4, it needs to be equal to about a birefringence index Δn=(Ne_2−No)/4.

Figure 11:
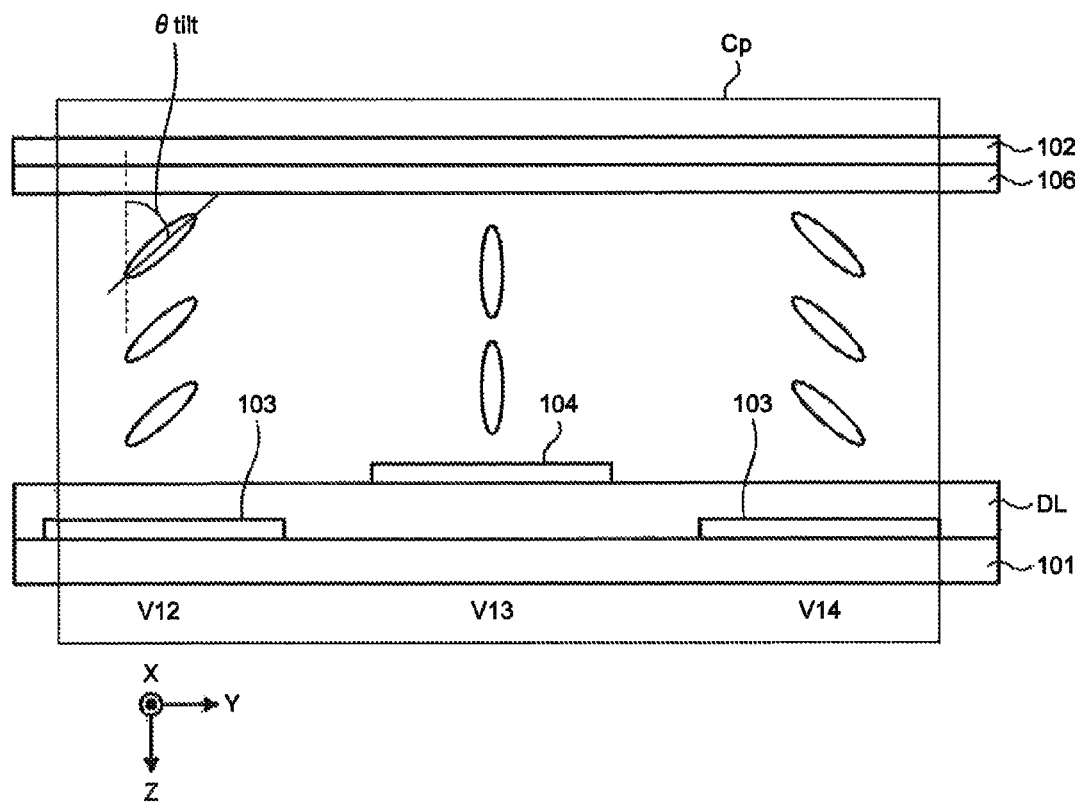
FIG. 11 illustrates a lens central portion.

Explained below with reference to FIG. 11 is a case of controlling the tilt of the liquid crystal directors in such a way that Equation (12) given above is satisfied at a lens central portion Cp of the Fresnel lens enclosed by solid lines in FIG. 9. In the example illustrated in FIG. 11, the direction of polarization and the orientation of the liquid crystals are set to be in the direction orthogonal to the extending direction of the first-type electrodes 103 and the second-type electrodes 104 (set in the Y-direction illustrated in FIG. 11). In this example, if the initial orientation of the liquid crystals is set to be same as the direction of polarization, then the refractive index can be controlled according to the tilt angle θtilt of the liquid crystal directors. However, in the example illustrated in FIG. 11, the change in the tilt angle θtilt to the left side of the center of the center lens is symmetrical to the change in the tilt angle θtilt to the right side of the center of the center lens. For that reason, it is possible to think of a case in which, at the center of the center lens, an area having the tilt angle θtilt=0° is formed thereby leading to a great disturbance in the refractive-index distribution. Besides, for the tilt angle θtilt=0°, there is a possibility that a twist component is generated having a tilt in the X-direction illustrated in FIG. 11. As a result, the retardation cannot be controlled with only the tilt angle of the liquid crystal directors, thereby deteriorating the refractive-index distribution that acts as a lens.

Figure 12:
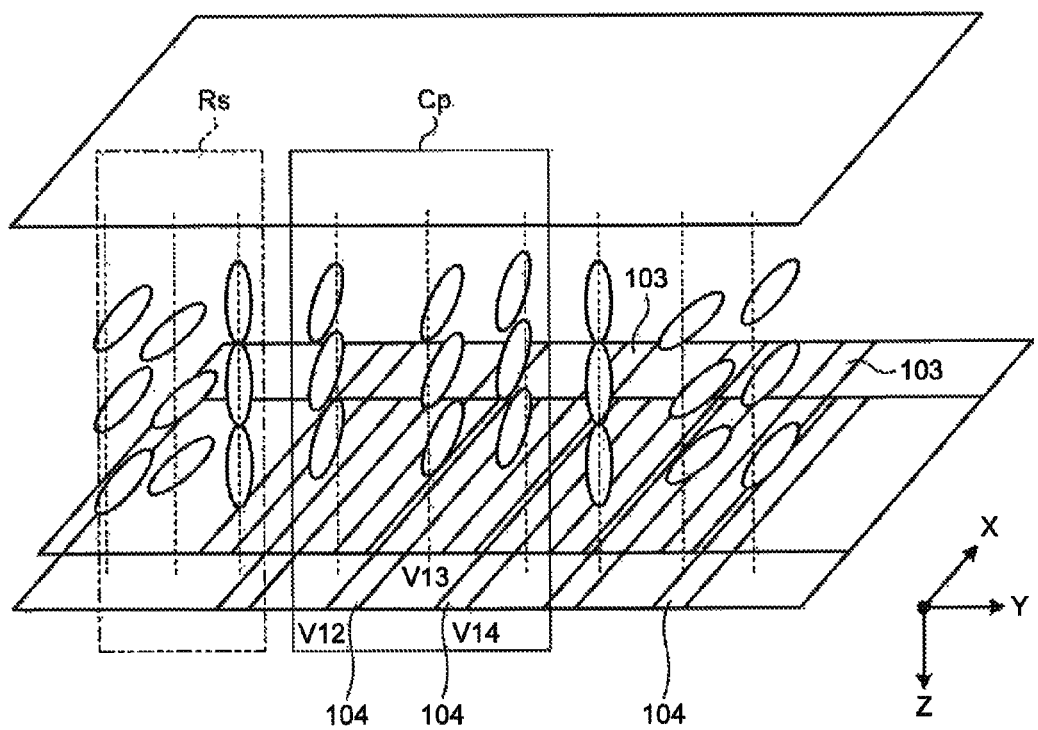
FIG. 12 illustrates a lens central portion.

For that reason, when the Fresnel-type liquid crystal GRIN lens formed in the second mode has one step; as illustrated in FIG. 12, the initial orientation of the liquid crystals is set parallel to the extending direction of the first-type electrodes 103 and the second-type electrodes 104 (in the example illustrated in FIG. 12, in the X-direction), and the setting is made such that the light having polarization in the same direction as the initial orientation enters the optical element 10. In essence, in the case when the maximum retardation value of the center lens of the Fresnel-type liquid crystal GRIN lens formed in the second mode has a difference with the maximum retardation value of the step portion that is equal to or greater than a reference value, then it is desirable that the initial orientation of the liquid crystals is set parallel to the extending direction of each electrode, and it is desirable that the setting is made such that the light having polarization in the same direction as the initial orientation enters the optical element 10.

In the example illustrated in FIG. 12, at the center of the center lens, the tilt of the liquid crystal directors is determined according to the differences of electrical potentials V12, V13, and V14 between the electrodes formed on the first substrate 101 (the first-type electrodes 103 or the second-type electrodes 104) and the electrode formed on the second substrate 102 (the opposite electrode 106). Moreover, the tilt angles of those liquid crystal directors do not face the lens center; and, as illustrated in the portion Cp enclosed by solid lines in FIG. 12, are aligned in the same direction as the orientation of the liquid crystals and in the direction parallel to the extending direction of the electrodes formed on the first substrate 101 (the direction parallel to the X-direction illustrated in FIG. 12). For that reason, it becomes possible to generate a smooth refractive-index distribution at the center of the center lens.

Figure 13:
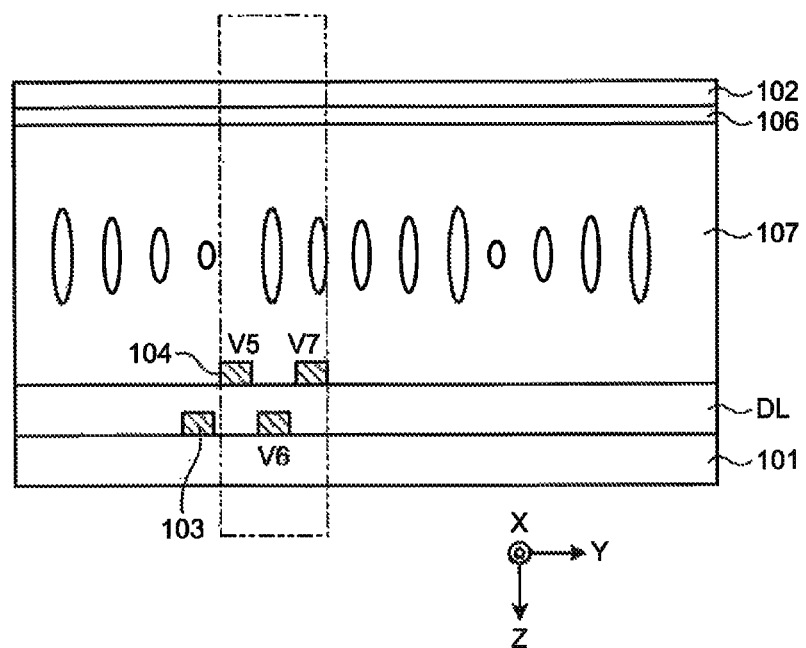
FIG. 13 illustrates the tilt of liquid crystal directors.

Moreover, in the example illustrated in FIG. 12, an area Rs enclosed by dotted lines represents the step portion of the Fresnel-type liquid crystal GRIN lens formed in the second mode. The liquid crystal directors in the step portion are controlled to rise on the near side to the center lens and controlled to lay on the near side to the edge lens in the similar manner to the example illustrated in FIG. 7. FIG. 13 is a diagram that schematically illustrates the tilt of the liquid crystal directors when the optical element 10 is seen from the X-direction.

Given below is the explanation of the voltage conditions for the formation of the Fresnel-type liquid crystal GRIN lens illustrated by solid lines in FIG. 9 (i.e., the Fresnel-type liquid crystal GRIN lens formed in the second mode). The voltage controller 30 controls the voltage applied to each electrode in such a way that the voltages applied to the electrodes placed at the positions corresponding to the ends of the Fresnel lens exhibit the maximum value and in such a way that the voltages applied to the electrodes placed at the positions corresponding to the step exhibit the local maximum value. The more specific explanation is as follows.

In the example illustrated in FIG. 9, from among a plurality of the second-type electrodes 104, the first second-type electrode from the left side is placed corresponding to one end of the Fresnel-type liquid crystal GRIN lens, and the 13-th second-type electrode 104 from the left side is placed corresponding to the other end of the Fresnel-type liquid crystal GRIN lens. Moreover, from among a plurality of the second-type electrodes 104, the seventh second-type electrode 104 from the left side is placed corresponding to the center of the Fresnel-type liquid crystal GRIN lens. Furthermore, from among a plurality of the second-type electrodes 104, the fourth second-type electrode 104 from the left side and the 10-th second-type electrode 104 from the left side are placed corresponding to the Fresnel step.

In the example illustrated in FIG. 9, V1 represents the electrical potential supplied to the first second-type electrode 104 from the left side; V3 represents the electrical potential supplied to the second second-type electrode 104 from the left side; V5 represents the electrical potential supplied to the third second-type electrode 104 from the left side; V7 represents the electrical potential supplied to the fourth second-type electrode 104 from the left side; V9 represents the electrical potential supplied to the fifth second-type electrode 104 from the left side; V11 represents the electrical potential supplied to the sixth second-type electrode 104 from the left side; V13 represents the electrical potential supplied to the seventh second-type electrode 104 from the left side; V15 represents the electrical potential supplied to the eighth second-type electrode 104 from the left side; V17 represents the electrical potential supplied to the ninth second-type electrode 104 from the left side; V19 represents the electrical potential supplied to the 10-th second-type electrode 104 from the left side; V21 represents the electrical potential supplied to the 11-th second-type electrode 104 from the left side; V23 represents the electrical potential supplied to the 12-th second-type electrode 104 from the left side; and V25 represents the electrical potential supplied to the 13-th second-type electrode 104 from the left side. Moreover, in this example, the electrical potential supplied to the opposite electrode 106 is set to 0 V.

Moreover, from among a plurality of the first-type electrodes 103, the first to 12-th first-type electrodes 103 from the left side are used in the formation of the Fresnel-type liquid crystal GRIN lens illustrated in FIG. 9. In the example illustrated in FIG. 9, V2 represents the electrical potential supplied to the first first-type electrode 103 from the left side; V4 represents the electrical potential supplied to the second first-type electrode 103 from the left side; V6 represents the electrical potential supplied to the third first-type electrode 103 from the left side; V8 represents the electrical potential supplied to the fourth first-type electrode 103 from the left side; V10 represents the electrical potential supplied to the fifth first-type electrode 103 from the left side; V12 represents the electrical potential supplied to the sixth first-type electrode 103 from the left side; V14 represents the electrical potential supplied to the seventh first-type electrode 103 from the left side; V16 represents the electrical potential supplied to the eighth first-type electrode 103 from the left side; V18 represents the electrical potential supplied to the ninth first-type electrode 103 from the left side; V20 represents the electrical potential supplied to the 10-th first-type electrode 103 from the left side; V22 represents the electrical potential supplied to the 11-th first-type electrode 103 from the left side; and V24 represents the electrical potential supplied to the 12-th first-type electrode 103 from the left side.

If Ni represents the average refractive-index distribution of the liquid crystals present immediately above the electrodes supplied with voltages Vi (i=1 to 25); then the voltage applied to each electrode is controlled in such a way that the average refractive-index distribution of the lenses on the left side of the lens center satisfies N13>N12>N11>N10>N9>N8>N7<N6>N5>N4>N3>N2>N1 and in such a way that the average refractive-index distribution of the lenses on the right side of the lens center satisfies N13>N14>N15>N16>N17>N18>N19<N20>N21>N22>N23>N24>N25. Thus, in the example illustrated in FIG. 9, the voltage condition for the formation of the lenses present on the left side of the lens center becomes V13<V12<V11<V10<V9<V8<V7>V6<V5<V4<V3<V2<V1. Moreover, the voltage condition for the formation of the lenses present on the right side of the lens center becomes V13<V14<V15<V16<V17<V18<V19>V20<V21<V22<V23<V24<V25 (=V1).

In this way, the voltage applied to each electrode is controlled in such a way that the voltages V1 and V25 that are applied to the electrodes placed at the positions corresponding to the ends of the lens exhibit the maximum value, and in such a way that the voltages V7 and V19 that are applied to the electrodes placed at the position corresponding to the Fresnel step exhibit the local maximum value. As a result, the Fresnel-type liquid crystal GRIN lens illustrated in FIG. 9 is formed. Herein, the distance between those electrodes regarding which the applied voltages exhibit the maximum value (in this example, the distance $lpe\_2$ between the second-type electrode 104 supplied with the electrical potential V1 and the second-type electrode 104 supplied with the electrical potential V25) can be regarded as the lens pitch of the Fresnel-type liquid crystal GRIN lens illustrated in FIG. 9.

Given below with reference to the example illustrated in FIG. 9 is the explanation of the voltage conditions for the formation of the single-lens-type liquid crystal GRIN lens in the first mode. In this case, the voltage controller 30 controls the voltage applied to each electrode in such a way that the voltages applied to the electrodes placed at the positions corresponding to the ends of the lens exhibit the maximum value; in such a way that the voltage applied to the electrode placed at the position corresponding to the lens center exhibits the minimum value; and in such a way that, closer an electrode to the electrode placed at the position corresponding to the lens center, smaller is the voltage applied to that electrode. The more specific explanation is as follows. Meanwhile, as described earlier, in the example illustrated in FIG. 9, the refractive-index distribution of the single-lens-type liquid crystal GRIN lens formed in the first mode is same as the refractive-index distribution of the center lens of the Fresnel-type liquid crystal GRIN lens formed in the second mode.

In this case, from among a plurality of the second-type electrodes 104, the fourth second-type electrode 104 from the left side corresponds to one end of the single-lens-type liquid crystal GRIN lens formed in the first mode (the center lens formed in the second mode), while the 10-th second-type electrode from the left side corresponds to the other end of the single-lens-type liquid crystal GRIN lens formed in the first mode. Moreover, from among a plurality of the second-type electrodes 104, the seventh second-type electrode 104 from the left side corresponds to the center of the single lens. Herein, the electrical potentials supplied to the first-type electrodes 103 and the second-type electrodes 104 are represented in the same manner as in the second mode.

Herein, it is desirable that the average refractive-index distribution Ni goes on decreasing from the lens center toward the ends of the lens so that the parabolic shape expressed in Equation (1) is achieved. Accordingly, it is desirable that the lenses present on the left side of the lens center have the average refractive-index distribution satisfying N13>N12>N11>N10>N9>N8>N7; while it is desirable that the lenses present on the right side of the lens center have the average refractive-index distribution satisfying N13>N14>N15>N16>N17>N18>N19. Thus, the voltage condition for the formation of the lenses present on the left side becomes V13<V12<V11<V10<V9<V8<V7. Moreover, the voltage condition for the formation of the lenses present on the right side becomes V13<V14<V15<V16<V17<V18<V19. In this way, the voltage applied to each electrode is controlled in such a way that the voltages V7 and V19 that are applied to the electrodes placed at the positions corresponding to the ends of the lens exhibit the maximum value; in such a way that, closer an electrode to the electrode placed at the position corresponding to the lens center, smaller is the voltage applied to that electrode; and in such a way that the voltage V13 that is applied to the electrode placed at the position corresponding to the lens center exhibits the minimum value. As a result, the single-lens-type liquid crystal GRIN lens is formed. Herein, the distance between those electrodes regarding which the applied voltages exhibit the maximum value (in this example, the distance lpc_2 between the second-type electrode 104 supplied with the electrical potential V7 and the second-type electrode 104 supplied with the electrical potential V19) can be regarded as the lens pitch of the single-lens-type liquid crystal GRIN lens.

In this example, the refractive-index distribution of the single-lens-type liquid crystal GRIN lens formed in the first mode is same as the refractive-index distribution of the center lens of the Fresnel-type liquid crystal GRIN lens formed in the second mode. Hence, in addition to be able to have a uniform focal point distance, the electrodes placed corresponding to the center lens formed in the second mode have unchanged electrical potentials supplied thereto in the first mode and in the second mode. It offers an advantage that the electrical potentials supplied to the electrodes placed corresponding to the center lens formed in the second mode can be controlled with ease.

Figure 14:
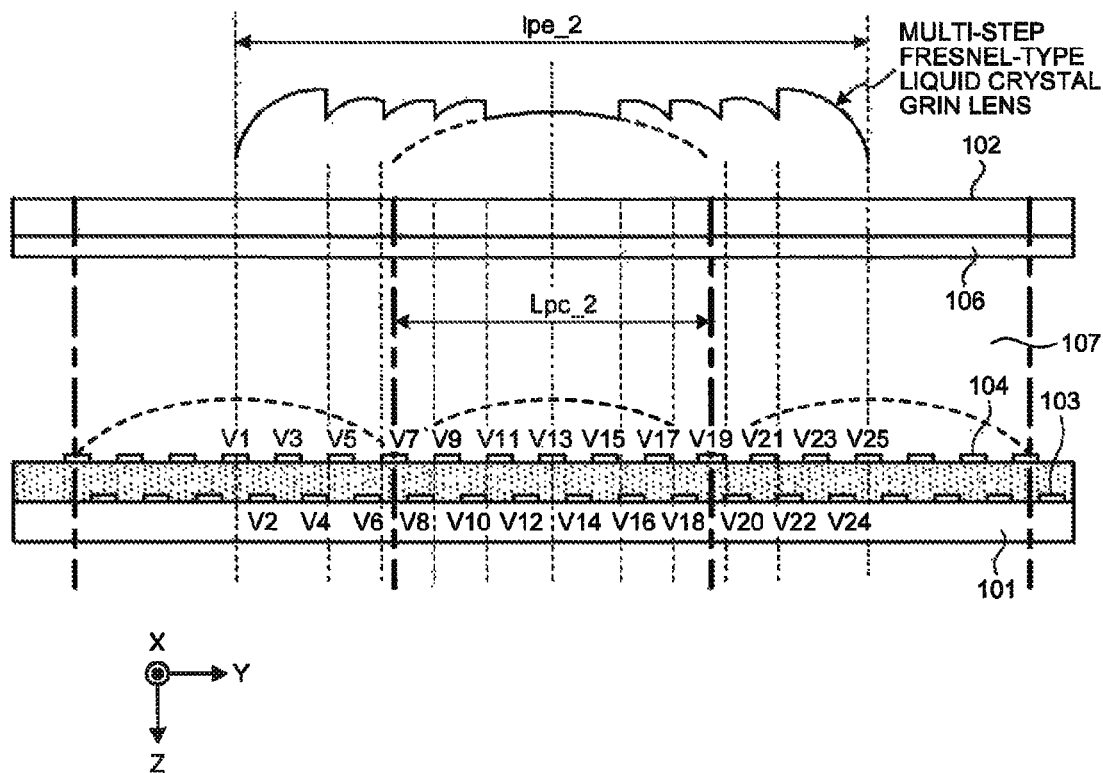
FIG. 14 illustrates a multi-step Fresnel lens.

The explanation given above is about a case in which the Fresnel-type liquid crystal GRIN lens formed in the second mode has one step. However, that is not the only possible case. Alternatively, it is possible to arbitrarily change the number of steps of the Fresnel-type liquid crystal GRIN lens formed in the second mode. With reference to FIG. 14, the following explanation is given for a case in which the Fresnel-type liquid crystal GRIN lens formed in the second mode has a plurality of steps, that is, a case in which a multi-step Fresnel-type liquid crystal GRIN lens is formed.

In the example illustrated in FIG. 14, in the first mode, the voltage controller 30 controls the voltage applied to the optical element 10 in such a way that a refractive-index distribution is achieved which acts as a single-lens having the lens pitch lpc_2. In the second mode, the voltage controller 30 controls the voltage applied to the optical element 10 in such a way that a refractive-index distribution is achieved which acts as a multi-step Fresnel lens having the lens pitch lpe_2(=lpc_2×2).

Figure 15:
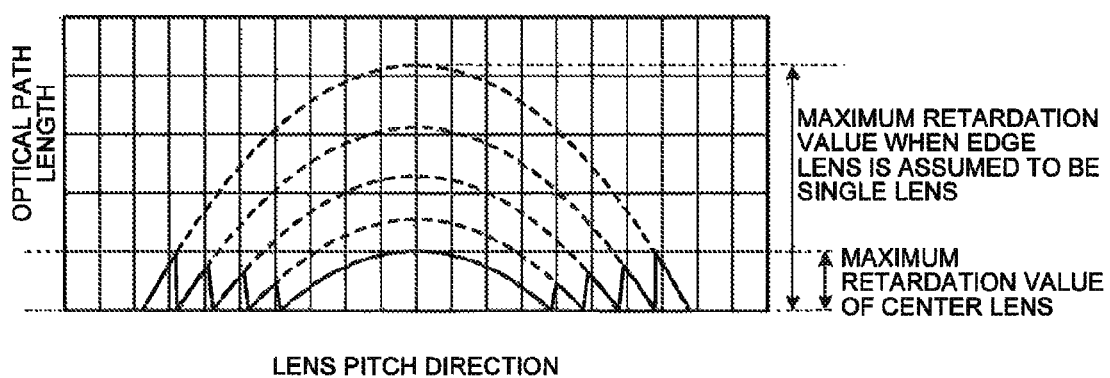
FIG. 15 is a diagram illustrating retardation values of a center lens and an edge lens.

According to Equation (10) given above, in order to double the lens pitch on condition that the focal point distance is not changed, it is necessary to quadruple the liquid crystal thickness or to quadruple the retardation (Δn×liquid crystal thickness) under the condition that Δn is constant. More particularly, as illustrated in FIG. 15, the maximum retardation value of the center lens is one-fourth of the maximum retardation value in the case in which the edge lens is assumed to be a single lens. If Ne_3 represents the average refractive index and if tc_2 represents the liquid crystal thickness of the center lens, then the maximum retardation value of the center lens is expressed using Equation (13) given below.

$$Re\_center2 = (Ne\_3 - No) \times tc\_3 \quad (13)$$

If the lens pitch of the edge lens is m-fold, then the retardation value of the edge lens is expressed using Equation (14) given below.

$$Re\_edge2 = (Ne\_3 - No) \times m^2 \times tc\_3 \quad (14)$$

For example, if m=2, by providing a plurality of steps, it is as if a refractive index difference that is quadruple of the birefringence Δn=(Ne−No) of the liquid crystals is achieved with the same liquid crystal thickness. With that, it becomes possible to expand the visible area angle. Besides, in the case of forming the multi-step Fresnel-type liquid crystal GRIN lens in the second mode, it becomes possible to prevent a situation in which the difference between the maximum retardation value of the center lens and the maximum retardation value of the step portion is equal to or greater than a reference value. As a result, the settings can be such that the initial orientation of the liquid crystals is set to be orthogonal to the extending direction of the first-type electrodes 103 and the second-type electrodes 104, and that the light having polarization in the same direction as the initial orientation enters the optical element 10.

Given below is the explanation of the voltage conditions for the formation of the multi-step Fresnel-type liquid crystal GRIN lens illustrated in FIG. 14. In this case too, the voltage controller 30 controls the voltage applied to each electrode in such a way that the voltages applied to the electrodes placed at the positions corresponding to the ends of the Fresnel lens exhibit the maximum value and the voltages applied to the electrodes placed at the positions corresponding to the steps exhibit the local maximum value. The more specific explanation is as follows.

In the example illustrated in FIG. 14, from among a plurality of the second-type electrodes 104, the fourth second-type electrode 104 from the left side is placed corresponding to one end of the multi-step Fresnel-type liquid crystal GRIN lens, and the 16-th second-type electrode 104 from the left side is placed corresponding to the other end of the multi-step Fresnel-type liquid crystal GRIN lens. Moreover, from among a plurality of the second-type electrodes 104, the 10-th second-type electrode 104 from the left side is placed corresponding to the center of the multi-step Fresnel-type liquid crystal GRIN lens. Furthermore, from among a plurality of the second-type electrodes 104, the sixth second-type electrode 104 from the left side, the seventh second-type electrode 104 from the left side, the eighth second-type electrode 104 from the left side, the ninth second-type electrode 104 from the left side, the 11-th second-type electrode 104 from the left side, the 12-th second-type electrode 104 from the left side, the 13-th second-type electrode 104 from the left side, and the 14-th second-type electrode 104 from the left side are placed corresponding to the Fresnel steps.

In the example illustrated in FIG. 14, V1 represents the electrical potential supplied to the fourth second-type electrode 104 from the left side; V3 represents the electrical potential supplied to the fifth second-type electrode 104 from the left side; V5 represents the electrical potential supplied to the sixth second-type electrode 104 from the left side; V7 represents the electrical potential supplied to the seventh second-type electrode 104 from the left side; V9 represents the electrical potential supplied to the eighth second-type electrode 104 from the left side; V11 represents the electrical potential supplied to the ninth second-type electrode 104 from the left side; V13 represents the electrical potential supplied to the 10-th second-type electrode 104 from the left side; V15 represents the electrical potential supplied to the 11-th second-type electrode 104 from the left side; V17 represents the electrical potential supplied to the 12-th second-type electrode 104 from the left side; V19 represents the electrical potential supplied to the 13-th second-type electrode 104 from the left side; V21 represents the electrical potential supplied to the 14-th second-type electrode 104 from the left side; V23 represents the electrical potential supplied to the 15-th second-type electrode 104 from the left side; and V25 represents the electrical potential supplied to the 16-th second-type electrode 104 from the left side. Moreover, in this example, the electrical potential supplied to the opposite electrode 106 is set to 0 V.

Moreover, from among a plurality of the first-type electrodes 103, the fourth to 15-th first-type electrodes 103 from the left side are used in the formation of the multi-step Fresnel-type liquid crystal GRIN lens illustrated in FIG. 14. In the example illustrated in FIG. 14, V2 represents the electrical potential supplied to the fourth first-type electrode 103 from the left side; V4 represents the electrical potential supplied to the fifth first-type electrode 103 from the left side; V6 represents the electrical potential supplied to the sixth first-type electrode 103 from the left side; V8 represents the electrical potential supplied to the seventh first-type electrode 103 from the left side; V10 represents the electrical potential supplied to the eighth first-type electrode 103 from the left side; V12 represents the electrical potential supplied to the ninth first-type electrode 103 from the left side; V14 represents the electrical potential supplied to the 10-th first-type electrode 103 from the left side; V16 represents the electrical potential supplied to the 11-th first-type electrode 103 from the left side; V18 represents the electrical potential supplied to the 12-th first-type electrode 103 from the left side; V20 represents the electrical potential supplied to the 13-th first-type electrode 103 from the left side; V22 represents the electrical potential supplied to the 14-th first-type electrode 103 from the left side; and V24 represents the electrical potential supplied to the 15-th first-type electrode 103 from the left side.

If Ni represents the average refractive-index distribution of the liquid crystals present immediately above the electrodes supplied with voltages Vi (i=1 to 25); then the voltage applied to each electrode is controlled in such a way that the average refractive-index distribution of the lenses on the left side of the lens center satisfies N13>N12>N11< N10>N9<N8>N7<N6>N5<N4>N3>N2>N1 and in such a way that the average refractive-index distribution of the lenses on the right side of the lens center satisfies N13>N14>N15<N16>N17<N18>N19<N20>N21<N22> N23>N24>N25. Thus, in the example illustrated in FIG. 14, the voltage condition for the formation of the lenses present on the left side of the lens center becomes V13<V12<V11>V10<V9>V8<V7>V6<V5>V4<V3<V2< V1. Moreover, the voltage condition for the formation of the lenses present on the right side of the lens center becomes V13<V14<V15>V16<V17>V18<V19>V20<V21>V22< V23<V24<V25. In this way, the voltage applied to each electrode is controlled in such a way that the voltages V1 and V25 that are applied to the electrodes placed at the positions corresponding to the ends of the lens exhibit the maximum value, and in such a way that the voltages V5, V7, V9, V11, V15, V17, V19, and V21 that are applied to the electrodes placed at the positions corresponding to the Fresnel steps exhibit the local maximum value. As a result, the multi-step Fresnel-type liquid crystal GRIN lens illustrated in FIG. 14 is formed. Herein, the distance between those electrodes regarding which the applied voltages exhibit the maximum value (in this example, the distance lpe_2 between the second-type electrode 104 supplied with the electrical potential V1 and the second-type electrode 104 supplied with the electrical potential V25) can be regarded as the lens pitch of the multi-step Fresnel-type liquid crystal GRIN lens illustrated in FIG. 14.

As described above, in the present embodiment, in the first mode, the voltage controller 30 controls the voltage applied to the optical element 10 in such a way that a refractive-index distribution (a first-type refractive-index distribution) is achieved which acts as a Fresnel lens having zero steps (acts as a first-type Fresnel lens). In the second mode, the voltage controller 30 controls the voltage applied to the optical element 10 in such a way that a refractive-index distribution (a second-type refractive-index distribution) is achieved which acts as a Fresnel lens having a greater number of steps than the first-type Fresnel lens (acts as a second-type Fresnel lens). As a result, it becomes possible to provide an image display device that enables switching between the numbers of parallaxes and between visible area angles while curbing an increase in the thickness of the lens portion.

Herein, in the image display device 100 according to the present embodiment, depending on the intended purpose, the followings are changed: (1) pop-out/depth amount; (2) 3D resolution; and (3) visible area angle at which the viewer can view 3D images in a normal way, which are in trade-off relationship in a glasses-free 3D display. For example, if the number of parallaxes is increased to enhance the light beam density, then a satisfactory 3D display can be viewed in which images do not get broken even if the pop-up/depth amount becomes large. Alternatively, if the greater number of parallaxes is assigned within the lens pitch; then, although there is a decline in the 3D resolution, it becomes possible to expand the visible area angle without having to change the light beam density. Still alternatively, if the same number of parallaxes is assigned to a wider visible area angle, then the light beam density decreases, and reducing the pop-out/ depth amount enables achieving a satisfactory glasses-free 3D display. As far as switching between the numbers of parallaxes and between visible area angles is concerned, if changes are made as described above depending on the intended purpose; then it becomes possible to achieve 3D display catering to various specifications, thereby enabling achieving expansion in the range of use.

Figure 16:
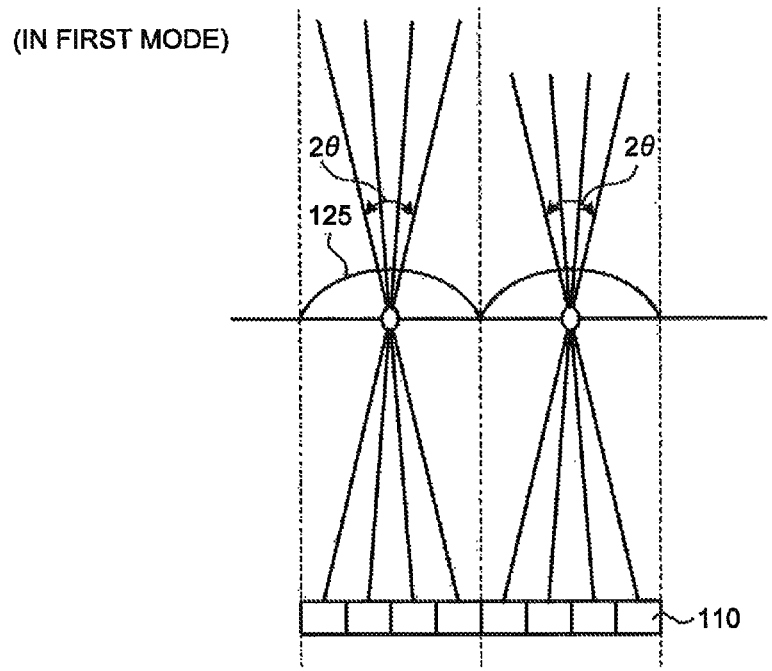
FIG. 16 illustrates the number of parallaxes and a visible area angle in a first mode.
Figure 17:
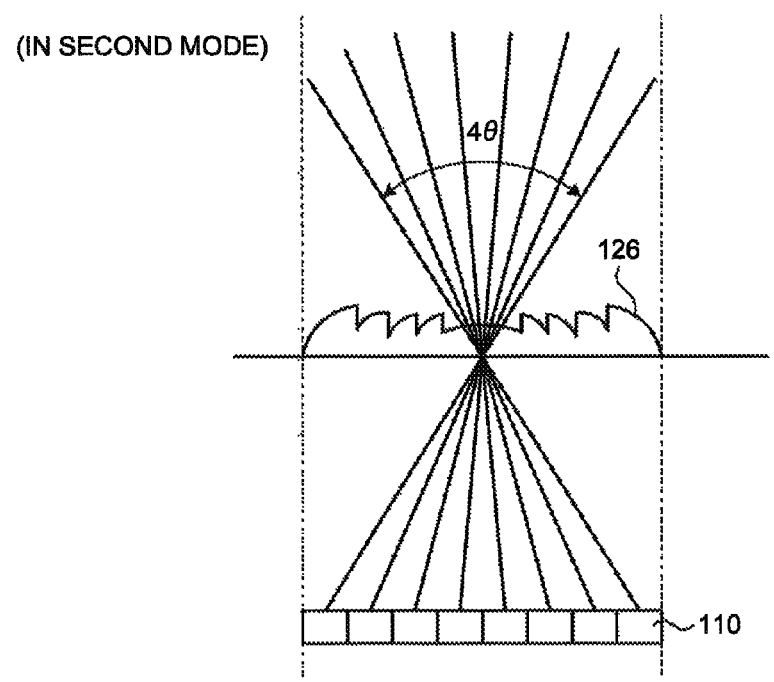
FIG. 17 illustrates the number of parallaxes and a visible area angle in a second mode.

For example, as illustrated in FIG. 16 and FIG. 17, in the first mode, the voltage applied to the optical element 10 is controlled in such a way that a first-type refractive index distribution 125 is achieved which acts as a single lens. Besides, the settings can be made in such a way that the number of parallaxes is equal to N parallaxes (in the example illustrated in FIG. 16, N=4), the visible area angle is equal to 2θ, and the light beam interval is equal to m radian. In the second mode, the voltage applied to the optical element 10 is controlled in such a way that a second-type refractive-index distribution 126 is achieved which acts as a multi-step Fresnel lens having twice the lens pitch than the lens pitch of the single lens achieved in the first mode. Besides, the settings can be made in such a way that the number of parallaxes is equal to 2N parallaxes (in the example illustrated in FIG. 17, N=4), the visible area angle is equal to 4θ, and the light beam interval is equal to m radian. In the examples illustrated in FIGS. 16 and 17, the exit angles are set in such a way that the parallax direction is same among adjacent lenses. When the mode is switched to the second mode; then, as compared to the first mode, the light beam density can be kept constant, the visible area angle can be doubled, and the resolution can be halved.

Figure 18:
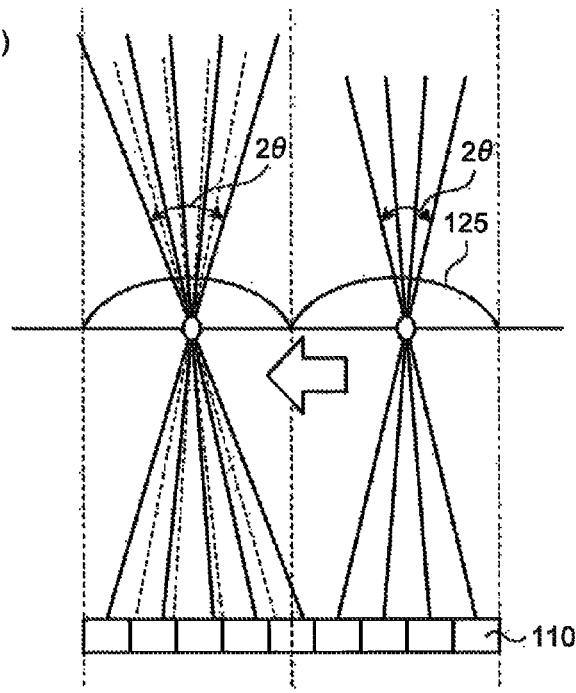
FIG. 18 illustrates the number of parallaxes and a visible area angle in the first mode.
Figure 19:
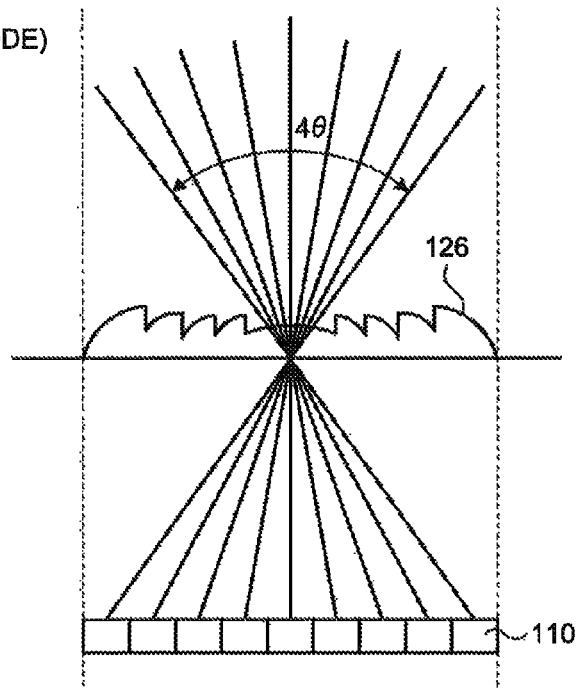
FIG. 19 illustrates the number of parallaxes and a visible area angle in the second mode.

Moreover, for example, as illustrated in FIG. 18 and FIG. 19, in the first mode, the voltage applied to the optical element 10 is controlled in such a way that the first-type refractive index distribution 125 is achieved which acts as a single lens. Besides, the settings can be made in such a way that the number of parallaxes is equal to 2N+1 parallaxes (in the example illustrated in FIG. 18, N=4), the visible area angle is equal to 2θ, and the light beam interval is equal to m radian. In the second mode, the voltage applied to the optical element 10 is controlled in such a way that the second-type refractive-index distribution 126 is achieved which acts as a multi-step Fresnel lens having twice the lens pitch than the lens pitch of the single lens achieved in the first mode. Besides, the settings can be made in such a way that the number of parallaxes is equal to 2N+1 parallaxes (in the example illustrated in FIG. 19, N=4), the visible area angle is equal to 4θ, and the light beam interval is equal to m/2 radian. In the examples illustrated in FIGS. 18 and 19, the exit angles are set in such a way that the parallax direction is interpolated among adjacent lenses. When the mode is switched to the second mode; then, as compared to the first mode, the light beam density can be halved, the visible area angle can be doubled, and the resolution can be the same.

MODIFICATION EXAMPLES

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. Given below is the explanation of modification examples, which can be combined in an arbitrary manner.

(1) First Modification Example

In the embodiment described above, in the first mode, a Fresnel-type liquid crystal GRIN lens having zero steps is formed. However, that is not the only possible case. Alternatively, for example, a Fresnel-type liquid crystal GRIN lens having one or more steps may also be formed. In essence, as long as the voltage applied to the optical element 10 is controlled in such a way that, in the first mode, a refractive-index distribution is achieved which acts as a first-type Fresnel lens and in such a way that, in the second mode, a refractive-index distribution is achieved which acts as a second-type Fresnel lens having a greater number of steps than the first-type Fresnel lens; it serves the purpose.

(2) Second Modification Example

Figure 20:
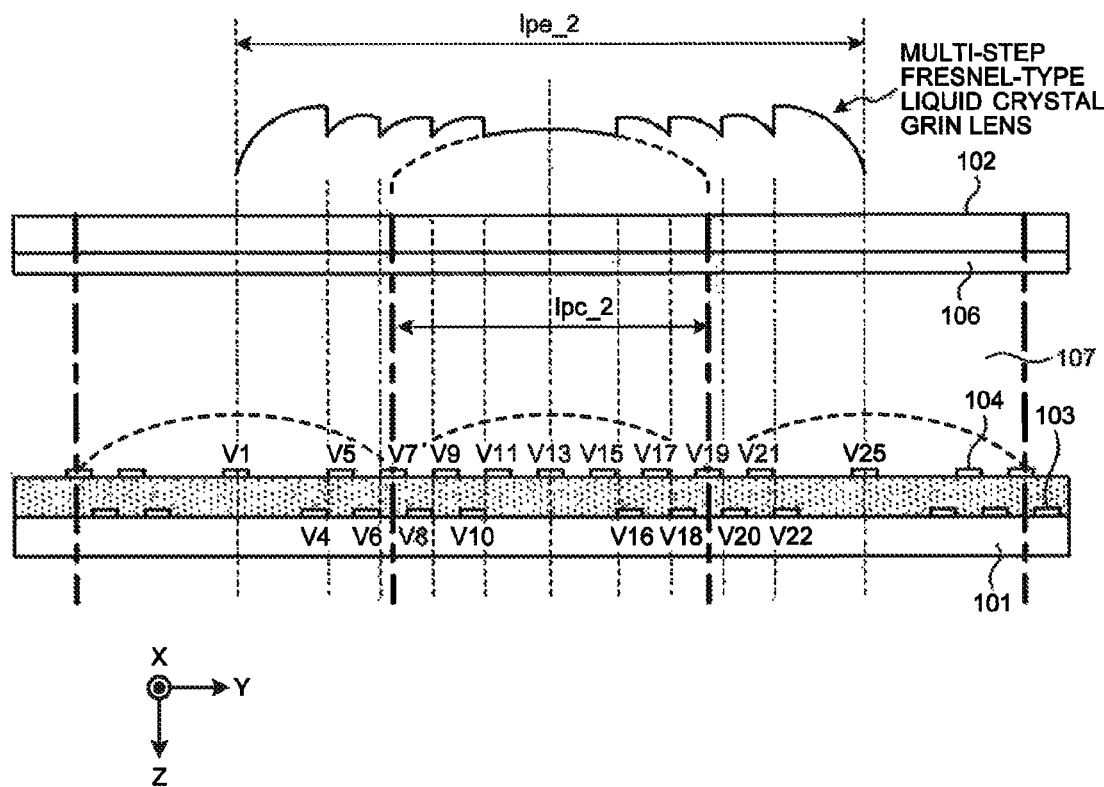
FIG. 20 is a diagram illustrating an electrode arrangement according to a modification example.

In the example illustrated in FIG. 14, the initial orientation of the liquid crystals is set orthogonal to the extending direction of the first-type electrodes 103 and the second-type electrodes 104 (in the example illustrated in FIG. 14, set orthogonal to the X-direction), and the setting is made such that the light having polarization in the same direction as the initial orientation enters the optical element 10. With that, it also becomes possible to omit some of the electrodes used in the formation of the multi-step Fresnel-type liquid crystal GRIN lens in the second mode. In the example illustrated in FIG. 14, it is assumed that the Y-direction represents the initial orientation of the liquid crystals as well as represents the direction of polarization. In the example illustrated in FIG. 14, due to the electrical potential distribution of the electrodes (the first-type electrodes 103 and the second-type electrodes 104) formed on the first substrate 101, it is not only that an electrical field is generated in the vertical direction (in the example illustrated in FIG. 14, the Z-direction) in which the opposite electrode 106 is present but also that an electrical field is generated in the horizontal direction (in the example illustrated in FIG. 14, the Y-direction) that is same as the lens pitch direction. Since the orientation of the liquid crystals is in the same direction as the direction in which the horizontal electrical field acts, the tilt of the liquid crystals can be controlled using the balance between the vertical electrical field and the horizontal electrical field. As illustrated in FIG. 14, since there is a steep change in the tilt of the liquid crystals at a step portion, electrodes are required on either side of a step portion. However, in an area such as the center lens area or the edge lens area in which the refractive-index distribution is smooth; even if the intermediary electrodes are removed, it is still possible to maintain the refractive-index distribution. In the example illustrated in FIG. 14, from among a plurality of the second-type electrodes 104, it is possible to remove the third second-type electrode 104 from the left, the second-type electrode 104 supplied with the electrical potential V3, and the second-type electrode 104 supplied with the electrical potential V23. Besides, from among a plurality of the first-type electrodes 103, it is possible to remove the third first-type electrode 103 from the left, the first-type electrode 103 supplied with the electrical potential V2, the first-type electrode 103 supplied with the electrical potential V12, the first-type electrode 103 supplied with the electrical potential V14, and the first-type electrode 103 supplied with the electrical potential V24 (see FIG. 20). In this way, if some of the electrodes are removed, it offers an advantage of being able to reduce the types of drive voltage and to simplify the configuration of the drive assembly (for example, the voltage controller 30 and the voltage supply 40).

(3) Third Modification Example

Figure 21:
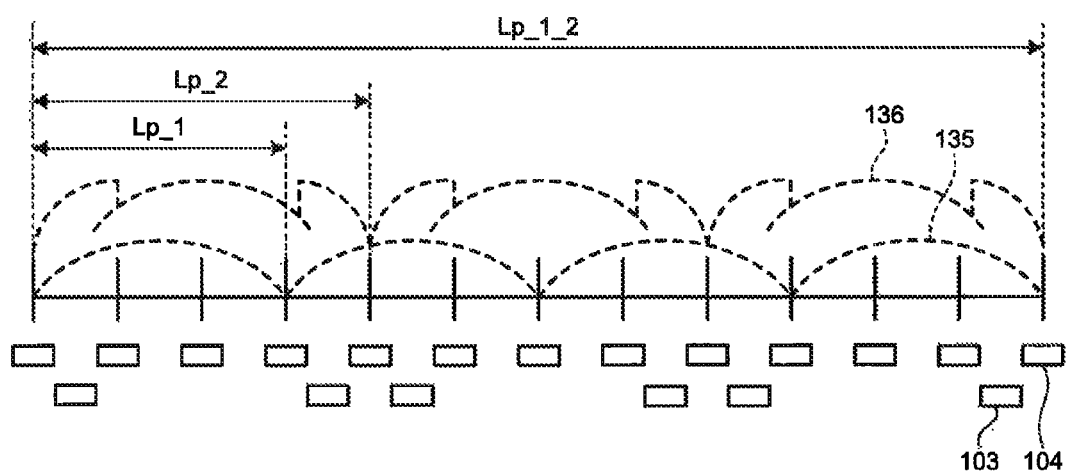
FIG. 21 illustrates the optical element according to a modification example.

In the example illustrated in FIG. 21, in the first mode, the voltage controller 30 controls the voltage applied to the optical element 10 in such a way that a refractive-index distribution 135 is achieved which acts as a Fresnel lens having the lens pitch lp_1 and having zero steps. In the second mode, the voltage controller 30 controls the voltage applied to the optical element 10 in such a way that a refractive-index distribution 136 is achieved which acts as a Fresnel lens having the lens pitch lp_2(>Lp_1) and having one step. More particularly, in the first mode, the voltage controller 30 controls the voltage applied to the optical element 10 in such a way that a lens array is formed in which single-lens-type liquid crystal GRIN lenses having the lens pitch lp_1 are arranged in a cyclic manner. In the second mode, the voltage controller 30 controls the voltage applied to the optical element 10 in such a way that a lens array is formed in which Fresnel-type liquid crystal GRIN lenses having the lens pitch lp_2 and having one step are arranged in a cyclic manner. The relationship between the lens pitch Lp_1 and the lens pitch Lp_2 can be expressed using Equation (15) given below. In Equation (15), n represents an integer equal to or greater than 1, and m is an integer greater than n.

$$Lp\_1 \times m = Lp\_2 \times n \quad (15)$$

Herein, as illustrated in FIG. 21, Lp_1_2 represents the pitch of a liquid crystal lens array of the smallest unit satisfying Equation (15) given above. In the example illustrated in FIG. 21, Lp_1_2=Lp_1×4=Lp_2×3 is satisfied. More particularly, the following explanation is given with the focus on the liquid crystal lens array of the smallest unit satisfying Equation 15 given above.

Figure 22:
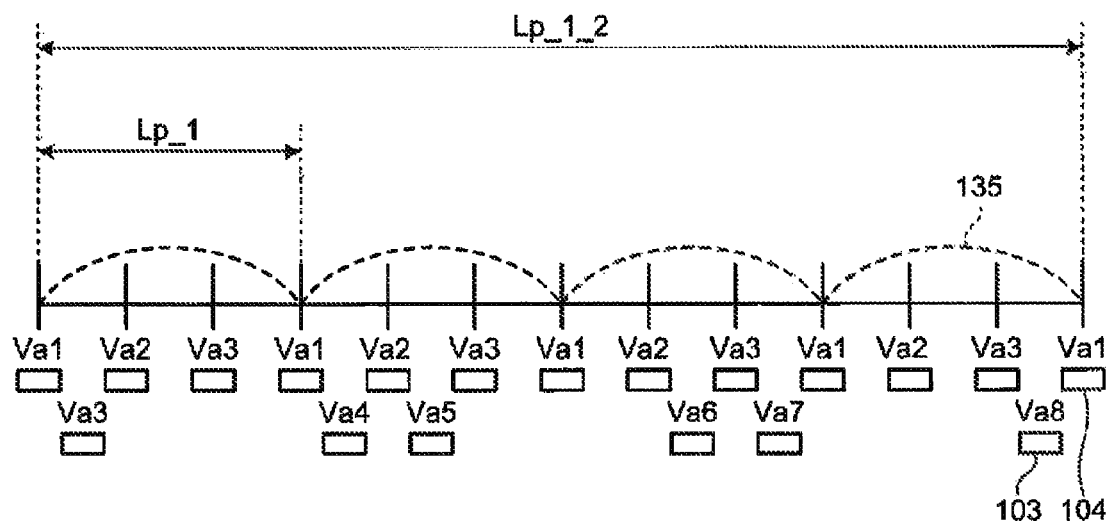
FIG. 22 illustrates a single lens formed in the first mode according to a modification example.

As illustrated in FIG. 22, in the first mode, a lens array is formed in which four single-lens-type liquid crystal GRIN lenses are arranged in a cyclic manner. In the following explanation with reference to FIG. 22, the single lens placed first from the left side is called a first single lens, the single lens placed second from the left side is called a second single lens, the single lens placed third from the left side is called a third single lens, and the single lens placed fourth from the left side is called a fourth single lens. In the example illustrated in FIG. 22, in the formation of the first single lens, the first to fourth second-type electrodes 104 from the left side from among a plurality of the second-type electrodes 104 (from among the 13 second-type electrodes 104) are used and the first first-type electrode 103 from the left side from among a plurality of the first-type electrodes 103 (from among the six first-type electrodes 103) is used. The first second-type electrode 104 is placed corresponding to one end of the first single lens, and the fourth second-type electrode 104 is placed corresponding to the other end of the first single lens.

In a similar manner, in the formation of the second single lens, the fourth to seventh second-type electrodes 104 from the left side from among a plurality of the second-type electrodes 104 are used and the second and third first-type electrodes 103 from the left side from among a plurality of the first-type electrodes 103 are used. The fourth second-type electrode 104 is placed corresponding to one end of the second single lens, and the seventh second-type electrode 104 is placed corresponding to the other end of the second single lens. Moreover, in the formation of the third single lens, the seventh to the 10-th second-type electrodes 104 from the left side from among a plurality of the second-type electrodes 104 are used and the fourth and fifth first-type electrodes 103 from the left side from among a plurality of the first-type electrodes 103 are used. The seventh second-type electrode 104 is placed corresponding to one end of the third single lens, and the 10-th second-type electrode 104 is placed corresponding to the other end of the third single lens. Furthermore, in the formation of the fourth single lens, the 10-th to 13-th second-type electrodes 104 from the left side from among a plurality of the second-type electrodes 104 are used and the sixth first-type electrode 103 from the left side from among a plurality of the first-type electrodes 103 is used. The 10th second-type electrode 104 is placed corresponding to one end of the third single lens, and the 13-th second-type electrode 104 is placed corresponding to the other end of the third single lens.

In this example, the first first-type electrode 103 is so placed that it is positioned between the first second-type electrode 104 and the third second-type electrode 104. The second first-type electrode 103 is so placed that it is positioned between the fourth second-type electrode 104 and the fifth second-type electrode 104. The third first-type electrode 103 is so placed that it is positioned between the fifth second-type electrode 104 and the sixth second-type electrode 104. The fourth first-type electrode 103 is so placed that it is positioned between the eighth second-type electrode 104 and the ninth second-type electrode 104. The fifth first-type electrode 103 is so placed that it is positioned between the ninth second-type electrode 104 and the 10-th second-type electrode 104. The sixth first-type electrode 103 is so placed that it is positioned between the 12-th second-type electrode 104 and the 13-th second-type electrode 104.

The voltage controller 30 controls the voltage applied to each electrode in such a way that a lens array is formed in which four single-lens-type liquid crystal GRIN lenses are arranged in a cyclic manner. In the example illustrated in FIG. 22, the electrical potential supplied to the opposite electrode 106 (not illustrated) is set to 0 V. Moreover, the electrical potential supplied to each of the first second-type electrode 104, the fourth second-type electrode 104, the seventh second-type electrode 104, the 10-th second-type electrode 104, and the 13-th second-type electrode 104 is set to a maximum value Va1. Furthermore, the electrical potential supplied to each of the second second-type electrode 104, the fifth second-type electrode 104, the eighth second-type electrode 104, and the 11-th second-type electrode 104 is set to Va2(<Va1). Moreover, the electrical potential supplied to each of the third second-type electrode 104, the sixth second-type electrode 104, the ninth second-type electrode 104, and the 12-th second-type electrode 104 is set to Va3(<Va1). Furthermore, the electrical potential supplied to the first first-type electrode 103 is set to Va3, the electrical potential supplied to the second first-type electrode 103 is set to Va4, the electrical potential supplied to the third first-type electrode 103 is set to Va5, the electrical potential supplied to the fourth first-type electrode 103 is set to Va6, the electrical potential supplied to the fifth first-type electrode 103 is set to Va7, and the electrical potential supplied to the sixth first-type electrode 103 is set to Va8.

Figure 23:
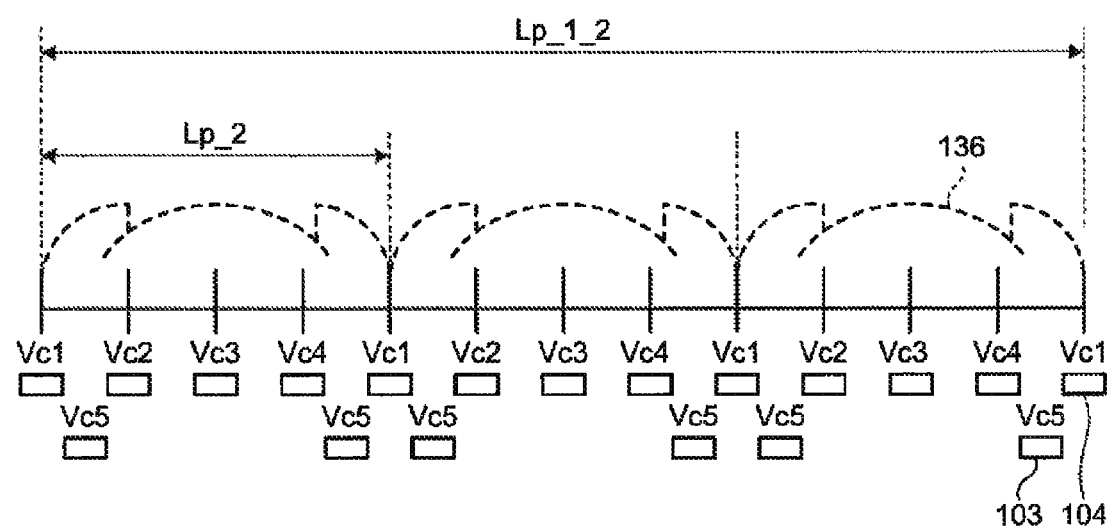
FIG. 23 illustrates a Fresnel lens formed in the second mode according to a modification example.

Meanwhile, as illustrated in FIG. 23, in the second mode, a lens array is formed in which three Fresnel-type liquid crystal GRIN lenses having one step are arranged in a cyclic manner. In the following explanation with reference to FIG. 23, the Fresnel lens placed first from the left side is called a first one-step Fresnel lens, the Fresnel lens placed second from the left side is called a second one-step Fresnel lens, the Fresnel lens placed third from the left side is called a third one-step Fresnel lens. In the example illustrated in FIG. 23, in the formation of the first one-step Fresnel lens, the first to fifth second-type electrodes 104 from the left side from among a plurality of the second-type electrodes 104 (from among the 13 second-type electrodes 104) are used and the first and second first-type electrodes 103 from the left side from among a plurality of the first-type electrodes 103 (from among the six first-type electrodes 103) are used. The first second-type electrode 104 is placed corresponding to one end of the first one-step Fresnel lens, and the fifth second-type electrode 104 is placed corresponding to the other end of the first one-step Fresnel lens.

In a similar manner, in the formation of the second one-step Fresnel lens, the fifth to ninth second-type electrodes 104 from the left side from among a plurality of the second-type electrodes 104 are used and the third and fourth first-type electrodes 103 from the left side from among a plurality of the first-type electrodes 103 are used. The fifth second-type electrode 104 is placed corresponding to one end of the second one-step Fresnel lens, and the ninth second-type electrode 104 is placed corresponding to the other end of the second one-step Fresnel lens. Moreover, in the formation of the third one-step Fresnel lens, the ninth to 13-th second-type electrodes 104 from the left side from among a plurality of the second-type electrodes 104 are used and the fifth and sixth first-type electrodes 103 from the left side from among a plurality of the first-type electrodes 103 are used. The ninth second-type electrode 104 is placed corresponding to one end of the third one-step Fresnel lens, and the 13-th second-type electrode 104 is placed corresponding to the other end of the third one-step Fresnel lens.

The voltage controller 30 controls the voltage applied to each electrode in such a way that a lens array is formed in which three Fresnel-type liquid crystal GRIN lenses having one step are arranged in a cyclic manner. In the example illustrated in FIG. 23, the electrical potential supplied to the opposite electrode 106 (not illustrated) is set to 0 V. Moreover, the electrical potential supplied to each of the first second-type electrode 104, the fifth second-type electrode 104, the ninth second-type electrode 104, and the 13-th second-type electrode 104 is set to a maximum value Vc1. Furthermore, the electrical potential supplied to each of the second second-type electrode 104, the sixth second-type electrode 104, and the 10-th second-type electrode 104 is set to Vc2. Moreover, the electrical potential supplied to each of the third second-type electrode 104, the seventh second-type electrode 104, and the 11-th second-type electrode 104 is set to Vc3. Furthermore, the electrical potential supplied to each of the fourth second-type electrode 104, the eighth second-type electrode 104, and the 12-th second-type electrode 104 is set to Vc4. Moreover, the electrical potential supplied to each of the six first-type electrodes 103 is set to Vc5.

As far as the first mode is concerned, the types of voltage are set according to the relative positional relationships from the left end in the lens. For example, in FIG. 22, regarding the first and second first-type electrodes 103 from the left side, although both those electrodes are placed between the second-type electrode 104 supplied with the electrical potential Va1 and the second-type electrode 104 supplied with the electrical potential Va2, they are supplied with mutually different electrical potentials (Va3 and Va4). The reason for that is as follows. Fresnel steps are formed in the second mode. As illustrated in FIG. 21 (FIG. 23), regarding the first first-type electrode 103 from the left side, in the step portion, the lens end is present on the left side. Regarding the second first-type electrode 103 from the left side, in the step portion, the lens end is present on the right side. For that reason, if the first first-type electrode 103 and the second first-type electrode 103 have different distances from the second-type electrode 104 supplied with the electrical potential Va1 as well as from the second-type electrode 104 supplied with the electrical potential Va2, there are times when an enhancement in the light condensation characteristics is achieved. In other words, with reference to FIG. 21 (FIG. 23), if the distance from the first second-type electrode 104 as well as from the second second-type electrode 104 to the first first-type electrode 103 is different than the distance from the fourth second-type electrode 104 as well as from the fifth second-type electrode 104 to the second first-type electrode 103, there are times when an enhancement in the light condensation characteristics is achieved. In the case when it is better to have differing relative positional relationships in the lens, different values are set for the electrical potentials supplied to the first second-type electrode 104 and the second second-type electrode 104. Meanwhile, as far as the second mode is concerned, only the minimum number of electrodes required for the formation of the step portions is disposed.

In the example described above, in the liquid crystal lens array of the smallest unit, the number of electrodes includes the six first-type electrodes and the 13 second-type electrodes. The electrode placed at the left end (in the example illustrated in FIG. 21, the first second-type electrode 104) corresponds to one end of the lens array formed in the first mode as well as in the second mode, while the electrode placed at the right end (in the example illustrated in FIG. 21, the 13-th second-type electrode 104) corresponds to the other end of the lens array formed in the first mode as well as in the second mode. Hence, in the case in which a plurality of liquid crystal lens arrays of the smallest unit is combined, the electrical potential distribution mentioned above is repeated at adjacent positions.

Herein, if a lens formed in the first mode and a lens formed in the second mode have a bilaterally symmetric refractive-index distribution; then, by setting same values of the electrical potential of the electrodes placed at bilaterally symmetrical positions in the lens, it becomes possible to reduce the types of electrical potential that is supplied. In the example illustrated in FIG. 22, the setting can be such that the second second-type electrode 104, the third second-type electrode 104, the fifth second-type electrode 104, the sixth second-type electrode 104, the eighth second-type electrode 104, the ninth second-type electrode 104, the 11-th second-type electrode 104, and the 12-th second-type electrode 104 are supplied with the same value of electrical potential (for example, Va2). Moreover, the setting can be such that the first first-type electrode 103 and the sixth first-type electrode 103 are supplied with the same value of electrical potential (for example, Va). Furthermore, the setting can be such that the second first-type electrode 103 and the fifth first-type electrode 103 are supplied with the same value of electrical potential (for example, Va4). Moreover, the setting can be such that the third first-type electrode 103 and the fourth first-type electrode 103 are supplied with the same value of electrical potential (for example, Va5). Thus, the electrical potential supplied to each electrode can be set as illustrated in FIG. 24.

In the example illustrated in FIG. 23, the setting can be such that the second second-type electrode 104, the fourth second-type electrode 104, the sixth second-type electrode 104, the eighth second-type electrode 104, the 10-th second-type electrode 104, and the 12-th second-type electrode 104 are supplied with the same value of electrical potential (for example, Vc2). Thus, the electrical potential supplied to each electrode can be set as illustrated in FIG. 25.

In the examples illustrated in FIG. 22 and FIG. 23, in the first mode as well as in the second mode, regarding the electrical potentials supplied to the second-type electrodes 104, there are 12 combinations of (Va1, Vc1), (Va2, Vc2), (Va3, Vc3), (Va1, Vc4), (Va2, Vc1), (Va3, Vc2), (Va1, Vc3), (Va2, Vc4), (Va3, Vc1), (Va1, Vc2), (Va2, Vc3), and (Va3, Vc4). On the other hand, in the first mode as well as in the second mode, regarding the electrical potentials supplied to the first-type electrodes 103, there are six combinations of (Va3, Vc5), (Va4, Vc5), (Va5, Vc5), (Va6, Vc5), (Va7, Vc5), and (Va8, Vc5). Thus, in the first mode as well as in the second mode, there are 18 combinations in all of the electrical potentials supplied to each electrode.

Figure 24:
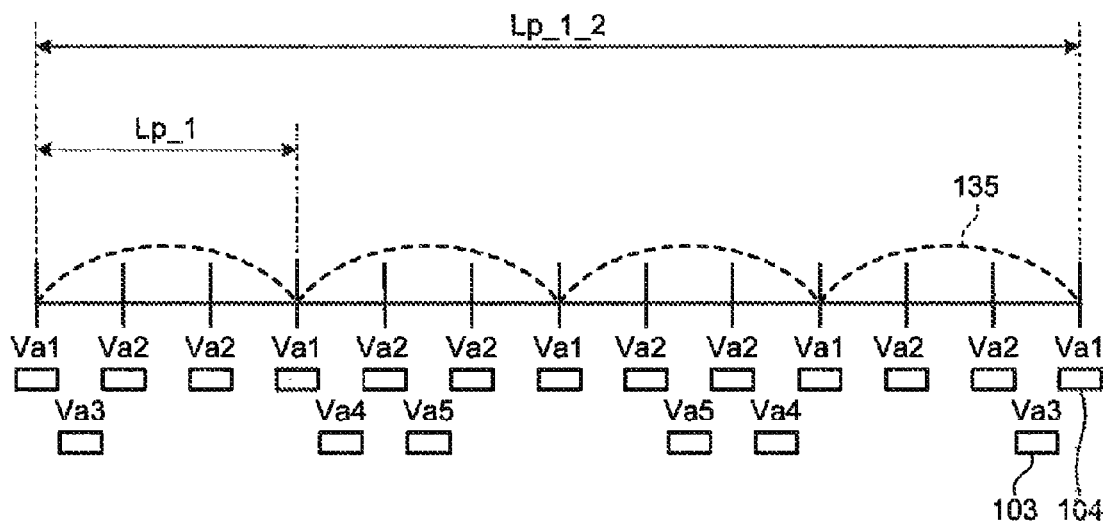
FIG. 24 is a diagram illustrating the electrical potential of each electrode in the first mode according to a modification example.
Figure 25:
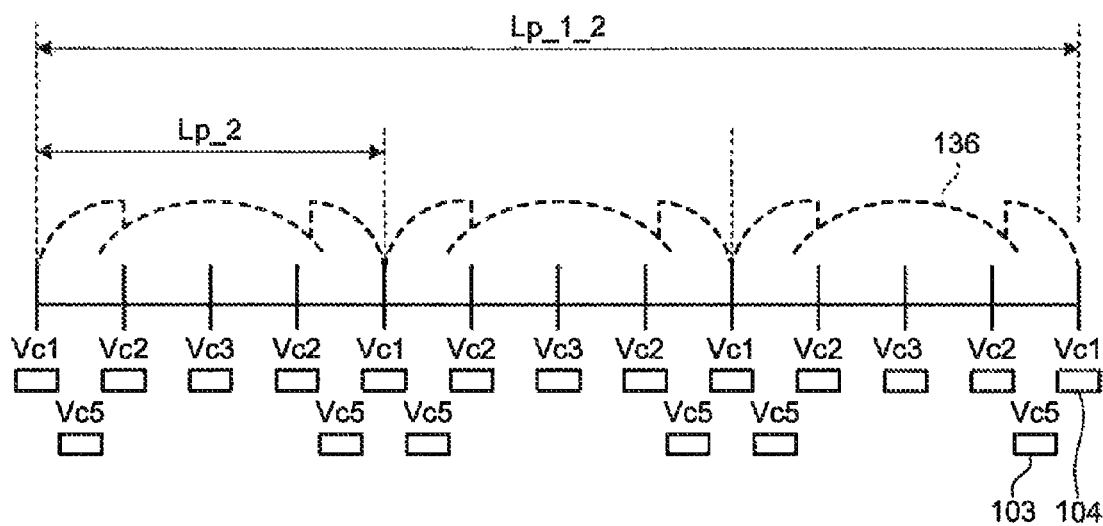
FIG. 25 is a diagram illustrating the electrical potential of each electrode in the second mode according to a modification example.

In contrast, in the example illustrated in FIG. 24 and FIG. 25, in the first mode as well as in the second mode, regarding the electrical potentials supplied to the second-type electrodes 104, there are six combinations of (Va1, Vc1), (Va2, Vc2), (Va2, Vc3), (Va1, Vc2), (Va2, Vc1), and (Va1, Vc3). On the other hand, in the first mode as well as in the second mode, regarding the electrical potentials supplied to the first-type electrodes 103, there are three combinations of (Va3, Vc4), (Va4, Vc4), and (Va5, Vc4). Thus, in the first mode as well as in the second mode, there are nine combinations in all of the electrical potentials supplied to each electrode. That is, as compared to the examples illustrated in FIG. 22 and FIG. 23, the types of electrical potential supplied to each electrode can be reduced as much as half. As a result of reducing the types of electrical potential supplied to each electrode, it becomes possible to downsize the dimension of the circuit (the size of the circuit) that generates the voltage. Hence, reduction in the cost can be achieved.

Figure 26:
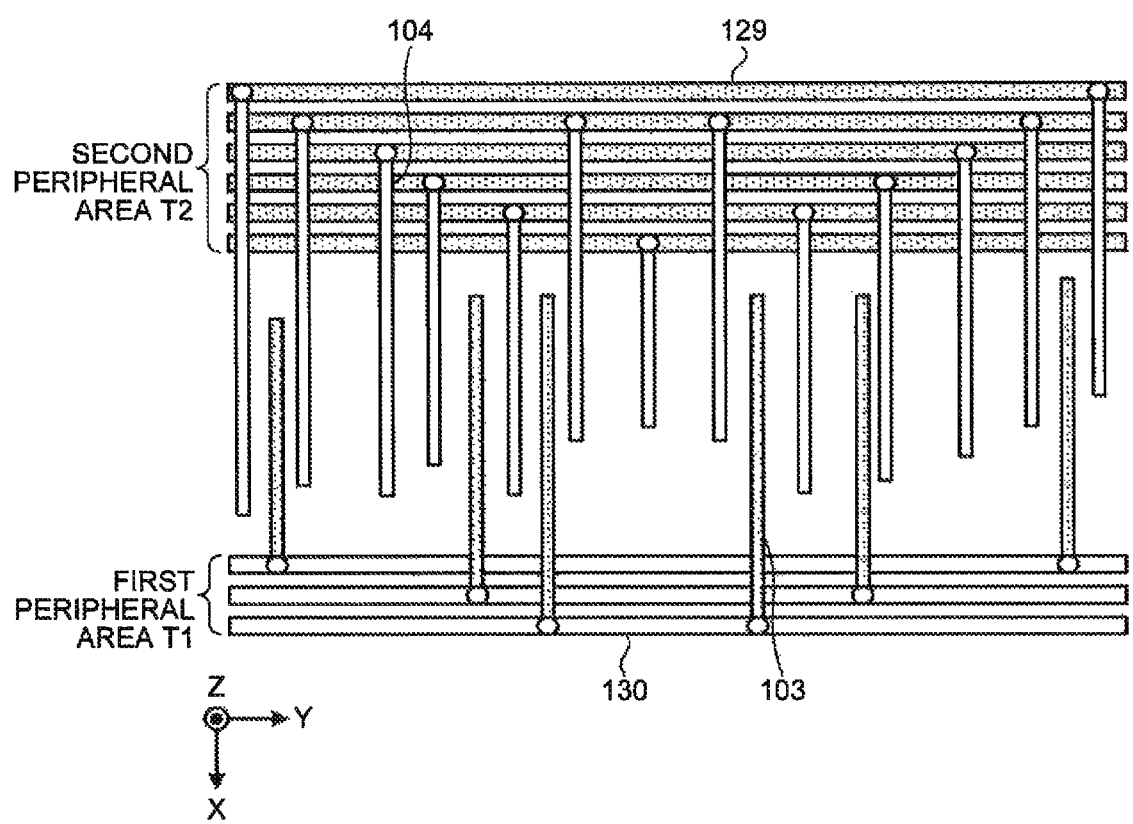
FIG. 26 is a diagram that illustrates a relation of connection between each electrode and power source wiring according to a modification example.

FIG. 26 is a schematic planar view when the optical element 10 is viewed from the Z-direction illustrated in FIG. 21. Herein, out of the optical element 10, in peripheral areas that are not opposite to the pixels of the display 20, electrical potential supply wiring (power source wiring) is laid and connected to each electrode. In the example illustrated in FIG. 26, an upper peripheral area is called a second peripheral area T2, and a lower peripheral area is called a first peripheral area T1. In this example, second-type power source wiring 129 that extends in the Y-direction and that is connected to the second-type electrodes 104 is disposed in the second peripheral area T2; while first-type power source wiring 130 that extends in the Y-direction and that is connected to the first-type electrodes 103 is disposed in the first peripheral area T1. In the example illustrated in FIG. 26, six lines of the second-type power source wiring 129 are disposed in parallel in the second peripheral area T2; while three lines of the first-type power source wiring 130 are disposed in parallel in the first peripheral area T1.

In the example illustrated in FIG. 26, to the first line of the second-type power source wiring 129 from the top are connected the first second-type electrode 104 and the 13-th second-type electrode 104 from among a plurality of the second-type electrodes 104. Moreover, to the second line of the second-type power source wiring 129 from the top are connected the second second-type electrode 104, the sixth second-type electrode 104, the eighth second-type electrode 104, and the 12-th second-type electrode 104 from among a plurality of the second-type electrodes 104. Furthermore, to the third second-type power source wiring 129 from the top are connected the third second-type electrode 104 and the 11-th second-type electrode 104 from among a plurality of the second-type electrodes 104. Moreover, to the fourth line of the second-type power source wiring 129 from the top are connected the fourth second-type electrode 104 and the 10-th second-type electrode 104 from among a plurality of the second-type electrodes 104. Furthermore, to the fifth line of the second-type power source wiring 129 from the top are connected the fifth second-type electrode 104 and the ninth second-type electrode 104 from among a plurality of the second-type electrodes 104. Moreover, to the sixth line of the second-type power source wiring 129 from the top is connected the seventh second-type electrode 104 from among a plurality of the second-type electrodes 104.

Besides, in the example illustrated in FIG. 26, to the first line of the first-type power source wiring 130 from the bottom are connected the third first-type electrode 103 and the fourth first-type electrode 103 from among a plurality of the first-type electrodes 103. Moreover, to the second line of the first-type power source wiring 130 from the bottom are connected the second first-type electrode 103 and the fifth first-type electrode 103 from among a plurality of the first-type electrodes 103. Furthermore, to the third line of the first-type power source wiring 130 from the bottom are connected the first first-type electrode 103 and the sixth first-type electrode 103 from among a plurality of the first-type electrodes 103.

As illustrated in the example in FIG. 26, by connecting a plurality of electrodes to the power source wiring (the second-type power source wiring 129 and the first-type power source wiring 130), it becomes possible to reduce the required number of lines of power source wiring as compared to a case in which a plurality of lines of power source wiring is disposed on a one-to-one basis corresponding to a plurality of electrodes. As a result, it becomes possible to reduce the area in which the power source wiring and the electrodes overlap with each other. That enables achieving reduction in the odds for the occurrence of electrical short circuit (short) in the interphases as well as enables achieving a boost in the yield.

Given below is the explanation about the relationship between the lens pitch $Lp\_1$ of the single-lens-type liquid crystal GRIN lens formed in the first mode and the lens pitch $Lp\_2$ of the Fresnel-type liquid crystal GRIN lens formed in the second mode. The least common multiple of the lens pitch $Lp\_1$ and the lens pitch $Lp\_2$ is equivalent to the pitch $Lp\_1\_2$ (the distance between two ends) of the liquid crystal lens array of the smallest unit. That is, the least common multiple of the lens pitch $Lp\_1$ and the lens pitch $Lp\_2$ is the smallest unit that satisfies the voltage combinations in the first mode and the voltage combinations in the second mode. Herein, smaller the least common multiple, smaller becomes the number of voltage combinations.

For example, assume that the number of electrodes, which is disposed within the lens pitch $Lp\_1\_2$ that is required to implement the first mode and the second mode, is 48 that has many common divisors. Since the common divisors of 48 are 1, 2, 3, 4, 6, 8, 12, 18, and 24; the combinations thereof serve as the candidates for the combinations of m and n given in Equation (15).

Regarding a case in which 48 is the least common multiple of the combinations of divisors of 48 and in which m and n are co-prime to each other, listed below are the candidates of the number of electrodes required for the formation of a single single-lens-type liquid crystal GRIN lens in the first mode (the lens pitch can be regarded to be $Lp\_1$) and the number of electrodes required for the formation of a single Fresnel-type liquid crystal GRIN lens (the lens pitch can be regarded to be $Lp\_2$).

24 electrodes($=Lp\_1$)×2($=m$) and 48 electrodes($=Lp\_2$)×1($=n$)

16 electrodes($=Lp\_1$)×3($=m$) and 48 electrodes($=Lp\_2$)×1($=n$)

12 electrodes($=Lp\_1$)×4($=m$) and 48 electrodes($=Lp\_2$)×1($=n$)

8 electrodes($=Lp\_1$)×6($=m$) and 48 electrodes($=Lp\_2$)×1($=n$)

16 electrodes(=Lp_1)×3(=m) and 24 electrodes(=Lp_2)×2(=n)

12 electrodes(=Lp_1)×4(=m) and 16 electrodes(=Lp_2)×3(=n)

Thus, at the smallest unit that satisfies voltage combinations in the first mode and the voltage combinations in the second mode, it is found that 48 electrodes are required. Meanwhile, from among the divisors of 48, following are the combinations of those divisors which are integers but are not co-prime to each other.

12 electrodes(=Lp_1)×4(=m) and 24 electrodes(=Lp_2)×2(=n)

8 electrodes(=Lp_1)×6(=m) and 16 electrodes(=Lp_2)×3(=n)

Herein, 24 is the least common multiple. Hence, 24 electrodes becomes the smallest unit of the voltage combinations for switching between the lens pitches. Thus, this case is different than the case in which 48 electrodes is the smallest unit.

In order to form a plurality of types of satisfactory refractive-index distribution lenses at the same focal point distance, it is necessary to determine the total number of electrodes and the positions of electrodes in such a way that the types of electrical potential are reduced while getting the necessary number of electrodes. Meanwhile, aside from the description given above, the parameters Lp_1, m, Lp_2, and n given in Equation (15) can be arbitrarily varied within a scope in which it is possible to form a plurality of types of satisfactory refractive-index distribution lenses at the same focal point distance.

(4) Fourth Modification Example

For example, the configuration can be such that the electrodes are formed on only one of the first substrate 101 and the second substrate 102. In this configuration, by applying the electrical field in the horizontal direction, it becomes possible to control the tilt of the liquid crystal directors. In essence, as long as the electrodes used in applying voltage to the liquid crystals are disposed on at least one of the first substrate 101 and the second substrate 102 that are positioned opposite to each other, it serves the purpose. However, as illustrated in FIG. 2, if a plurality of the first-type electrodes 103 is formed on the surface of the first substrate 101 on the side of the liquid crystal layer 107 and if the optical element 10 is viewed from the Z-direction illustrated in FIG. 2; then, according to a configuration in which the dielectrical layer DL that covers the first-type electrodes 103 has a plurality of the second-type electrodes 104 formed on the upper surface thereof in such a way that the adjacent first-type electrodes 103 have the single second-type electrode 104 positioned therebetween, two types of adjacent power electrodes that are used in the formation of Fresnel step portions can be set at arbitrary positions.

(5) Fifth Modification Example

In the embodiment described above, the value of the refractive index of the liquid crystal layer 107 changes to a reduced value as a value of an applied voltage increases. However, that is not the only possible case. Alternatively, for example, the value of the refractive index of the liquid crystal layer 107 can change to an increased value as a value of an applied voltage increases. In this case, in the first mode, the voltage controller 30 controls the voltage applied to each electrode in such a way that the voltages applied to the electrodes placed at the positions corresponding to the ends of the first-type Fresnel lens exhibit the minimum value. In the second mode, the voltage controller 30 controls the voltage applied to each electrode in such a way that the voltages applied to the electrodes placed at the positions corresponding to the ends of the second-type Fresnel lens exhibit the minimum value and in such a way that the voltages applied to the electrodes placed at the positions of the steps exhibit the local minimal value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device comprising:
    an optical element of which a refractive-index distribution changes according to a voltage applied thereto; and
    a voltage controller that controls the voltage applied to the optical element according to an indicated mode selected from modes including a first mode and a second mode, wherein
    the optical element acts as a single lens when the voltage according to the first mode is applied thereto,
    the optical element acts as a Fresnel lens when the voltage according to the second mode is applied thereto,
    the voltage controller controls, in the first mode, the voltage applied to the optical element in such a way that a first-type lens array is formed in which the single lens is arranged in a cyclic manner and controls, in the second mode, the voltage applied to the optical element in such a way that a second-type lens array is formed in which the Fresnel lens is arranged in a cyclic manner, and
    a relationship expressed in Equation (1) given below is established between a lens pitch of the single lens and a lens pitch of the Fresnel lens:

$$Lp\_1 \times m = Lp\_2 \times n \tag{1}$$

where $Lp\_1$ represents the lens pitch of the single lens, $Lp\_2$ represents the lens pitch of the Fresnel lens, n is an integer equal to or greater than 1, and m is an integer greater than n.

2. The device according to claim 1, wherein the optical element includes
    a first substrate and a second substrate placed opposite to each other,
    a liquid crystal layer that is provided between the first substrate and the second substrate, and
    a plurality of electrodes disposed on at least one of the first substrate and the second substrate.

3. The device according to claim 2, wherein a refractive index of the liquid crystal layer changes to a reduced value as a value of an applied voltage increases.

4. The device according to claim 3, wherein the voltage controller controls the voltage applied to each electrode in such a way that voltages applied to the electrodes corresponding to ends of lens exhibit a maximum value and that voltages applied to the electrodes corresponding to the step of lens exhibit a local maximum value, according to the indicated mode.

5. The device according to claim 1, wherein
the optical element includes
- a first substrate and a second substrate placed opposite to each other,
- a liquid crystal layer that is provided between the first substrate and the second substrate, and
- a plurality of electrodes disposed on at least one of the first substrate and the second substrate, and
the electrode corresponding to at least one end of the lens according to the first mode is the same as the electrode corresponding to at least one end of the lens according to the second mode.

6. The device according to claim 1, wherein
the optical element includes
- a first substrate and a second substrate placed opposite to each other,
- a liquid crystal layer that is provided between the first substrate and the second substrate, and
- a plurality of electrodes disposed on at least one of the first substrate and the second substrate,
the electrode corresponding to an end of the single lens being the same as the electrode corresponding to an end of a center lens, and the center lens representing a lens surface of the Fresnel lens that is partitioned by a concentric circle having a minimum radius.

7. The device according to claim 6, wherein the voltage controller controls the voltage applied to each electrode in such a way that a refractive-index distribution of the single lens matches with a refractive-index distribution of the center lens of the Fresnel lens.

8. The device according to claim 2, wherein, when the Fresnel lens has one step, an initial orientation of liquid crystals in the liquid crystal layer is parallel to an extending direction of each electrode.

9. An image display device comprising:
- the optical device according to claim 1; and
- a display that is disposed on a back side of the optical element and displays an image.

10. The device according to claim 9, wherein
the optical element includes
- a first substrate and a second substrate placed opposite to each other,
- a liquid crystal layer that is provided between the first substrate and the second substrate, and
- a plurality of electrodes disposed on at least one of the first substrate and the second substrate.

11. The device according to claim 10, wherein the display emits light having polarization in a same direction as an initial orientation of liquid crystals in the liquid crystal layer.

12. A driving method of driving an optical device including an optical element, the method comprising:
- controlling a voltage applied to the optical element, of which a refractive-index distribution changes according to a voltage applied thereto, according to an indicated mode selected from modes including a first mode and a second mode, wherein
- the optical element acts as a single lens when the voltage according to the first mode is applied thereto,
- the optical element acts as a Fresnel lens when the voltage according to the second mode is applied thereto,
- the controlling includes controlling, in the first mode, the voltage applied to the optical element in such a way that a first-type lens array is formed in which the single lens is arranged in a cyclic manner and controlling, in the second mode, the voltage applied to the optical element in such a way that a second-type lens array is formed in which the Fresnel lens is arranged in a cyclic manner, and
- a relationship expressed in Equation (1) given below is established between a lens pitch of the single lens and a lens pitch of the Fresnel lens:

$$Lp\_1 \times m = Lp\_2 \times n \tag{1}$$

where $Lp\_1$ represents the lens pitch of the single lens, $Lp\_2$ represents the lens pitch of the Fresnel lens, n is an integer equal to or greater than 1, and m is an integer greater than n.

\* \* \* \* \*